United States Patent
Hamer et al.

(10) Patent No.: US 8,056,341 B2
(45) Date of Patent: Nov. 15, 2011

(54) METHOD AND APPARATUS FOR STORING HEAT ENERGY

(75) Inventors: Steven John Hamer, Maroubra (AU); Stephen Hollis, Stanmore (AU); Richard Howard Gentle, Wahroonga (AU); Hirak Kumar Dutt, Parramatta (AU)

(73) Assignee: Lardken Pty Limited, Sydney, New South Wales (AU)

( * ) Notice: Subject to any disclaimer, the term of this patent is extended or adjusted under 35 U.S.C. 154(b) by 536 days.

(21) Appl. No.: 10/592,525

(22) PCT Filed: Mar. 14, 2005

(86) PCT No.: PCT/AU2005/000348
§ 371 (c)(1),
(2), (4) Date: Jan. 16, 2007

(87) PCT Pub. No.: WO2005/088218
PCT Pub. Date: Sep. 22, 2005

(65) Prior Publication Data
US 2007/0209365 A1    Sep. 13, 2007

(30) Foreign Application Priority Data

Mar. 12, 2004 (AU) .............................. 2004901299

(51) Int. Cl.
*F01K 1/00* (2006.01)
(52) U.S. Cl. ........................................................ 60/659
(58) Field of Classification Search .................. 60/645, 60/659
See application file for complete search history.

(56) References Cited

U.S. PATENT DOCUMENTS

| | | | | |
|---|---|---|---|---|
| 3,998,059 A * | 12/1976 | Randell | | 60/659 |
| 4,089,176 A | 5/1978 | Ashe | | |
| 4,091,622 A * | 5/1978 | Marchesi | | 60/641.15 |
| 4,136,276 A | 1/1979 | Ashe | | |
| 4,192,144 A * | 3/1980 | Pierce | | 60/641.8 |
| 5,994,681 A | 11/1999 | Lloyd | | |
| 6,272,856 B1 * | 8/2001 | Foppe | | 60/517 |

FOREIGN PATENT DOCUMENTS

| | | |
|---|---|---|
| CA | 2447502 A1 | 9/1995 |
| DE | 2401859 A | 7/1975 |
| DE | 3240257 A1 | 5/1984 |
| JP | 61-152788 A | 7/1986 |
| JP | H09-310921 A | 12/1997 |
| JP | 2000-274710 A | 10/2000 |
| JP | 2002-256970 A | 9/2002 |
| JP | 2003-065692 A | 3/2003 |
| JP | 2003-262483 A | 9/2003 |
| JP | 2003-279161 A | 10/2003 |
| JP | 2003-302181 A | 10/2003 |
| WO | WO 99/07804 A2 | 2/1999 |
| WO | WO 03/027595 A2 | 4/2003 |

* cited by examiner

*Primary Examiner* — Hoang Nguyen
(74) *Attorney, Agent, or Firm* — Fitch, Even, Tabin & Flannery

(57) ABSTRACT

A method of and an apparatus for storing heat energy in a body of graphite at an elevated temperature are disclosed. The method comprises heating an inner region of a body of graphite when it is required to store the heat energy and recovering the heat by way of a heat exchanger, when the energy is required to be used. The apparatus is suitable for the storage of renewable energy and electric energy obtainable from off peak periods of supply.

22 Claims, 8 Drawing Sheets

METHOD AND APPARATUS FOR STORING HEAT ENERGY

This Application is the National Phase of International Application No. PCT/AU2005/000348 filed Mar. 14, 2005, including such corrections thereto during the PCT stage, which International Application designated the U.S. and was published under PCT Article 21(2) in English, and this application claims, via the aforesaid International Application, the foreign priority benefit of and claims the priority from Australia Application No. 2004901299, filed Mar. 12, 2004, the complete disclosures of which are incorporated herein by reference.

TECHNICAL FIELD

The present invention relates to the storage of energy for later use. More particularly, the invention relates to a method of and an apparatus for storing heat energy in a body of graphite.

BACKGROUND OF THE INVENTION

Heat energy is a form of energy that can be utilised for a wide variety of purposes. Many processes depend for their operation on the availability of heat energy. However, the ease at which heat energy can be utilised is dependent on the temperature (or "level") at which it is available. Devices such as heat pumps designed to "move" or "upgrade" heat from low temperature levels to higher temperature levels are well known to the applicant. However, they are of limited application. In addition, no heat pumps are available for pumping heat at elevated temperatures.

One of the inherent disadvantages of heat energy is that, because of its tendency to be transferred to bodies having a lower temperature, it cannot be stored easily for extended periods of time. This applies in particular to heat at a high temperature. Thus, the higher the temperature at which heat is to be stored, the greater its tendency to be lost due to transfer to lower temperature bodies.

This disadvantage can be substantially overcome or ameliorated by inhibiting the ease at which heat can be lost from a reservoir or body in which it is stored.

Heat transfer can take place by way of conduction, convection or radiation. It is well known that heat loss through conduction can be counteracted by the use of thermal insulation materials, that heat loss from a container through convection can be counteracted by applying a vacuum in a space provided between the container and an enclosure around the container (such as in a vacuum flask), and that heat loss through radiation can be counteracted by the use of materials having surfaces of which the emissivity is low.

Compared to heat energy, electrical energy is not suitable for storage at a large scale. Currently available technologies for storing electrical energy in the form of chemical energy, such as batteries, are very limited in size and have a limited life span. Other technologies such as flywheels, supercapacitors and fuel cells are also only being developed on a small scale. All are characterised by much lower energy densities than a heat storage system and a much higher cost.

A problem faced by large scale commercial producers of electricity is the need to install generating capacity substantially in excess of the average demand, because electricity generating plant must have sufficient capacity to meet peaks of demand. In Australia, for instance, there are typically two peaks per day, one occurring in the mornings and the other in the evenings. In normal times, the differences between peak and off-peak vary between about 125% of average demand and about 75% of average demand respectively. Thus, in NSW, Australia, for example, if the daily average consumption of electricity is around 7500 MW, the normal variation is from about 6000 MW off peak to about 12000 MW at peak. The magnitude of the peaks is usually related to weather conditions. Thus, very hot and very cold weather cause high consumption of electricity. In some other countries, particularly in the northern hemisphere, the variations between peak and off peak are much greater.

World-wide, the variations between peak and average in a particular country or region depend on a range of factors such as the extent to which households in the country or region are connected to electricity, the per capita electricity consumption in the country or region, the cost of electricity, the relative proportions of electricity consumed by industry, mining, agriculture and private households, etc. To discourage the use of electricity during peak periods and to encourage consumption during off-peak periods, utilities often charge a premium for electricity supplied during peak periods. Additionally or as an alternative, a maximum demand charge is sometimes levied, where such charge is related to the need for the utility to create sufficient generating capacity to cater for periods of peak demand.

Existing technologies for storing electrical energy on a large scale include technologies such as pumped storage hydro-electric schemes and compressed air systems. They are limited in the extent to which they can contribute to the smoothing out of supply between peak and off-peak periods, as they can only be installed where geographic features permit.

Since electrical energy cannot be easily stored as such, there is a need for a viable system for converting electrical energy to heat energy and for storing it in that form until it can be utilised at a later time.

There also exists a need for the storage of heat energy for relatively short periods of time between an off-peak period and the next peak period.

Although technologies exist for the recovery of energy from renewable sources, these technologies often suffer from the disadvantage that much of the recovered energy cannot be utilised when the energy is available whilst, when it is needed, the renewable source is not available. Thus, because of differences in the times when they are available and the times at which they are required, these renewable energies cannot be easily integrated into existing power grids. Technologies included in this category include those directed at the recovery of solar, wind and wave energy in the form of heat or electricity.

There accordingly exists a need for the better integration of renewable energies into power grids by relocating times of availability to times of demand as well as the ability to convert an intermittent energy supply into a permanent supply by storing the energy for use when the renewable energy is not available.

Because temperature is the driving force for heat transfer, there is also a need for a method and an apparatus for storing heat energy at high temperatures.

U.S. Pat. No. 4,089,176 describes a method and apparatus for operating power turbomachinery which includes a heat energy storage device comprising a graphite core. The graphite core is heated from its outside surface by electromagnetic induction. However, this storage device suffers from the disadvantage that energy losses are high, which is an inherent problem in heating a body of graphite from the outside, because of the higher operating temperatures on the outside surface of the body of graphite. The heat loss is high despite attempts to minimize it by the use of insulation. In addition, the temperature that can be tolerated on the outside surface of the core is limited by the maximum operating temperature of the insulation material.

OBJECT OF THE INVENTION

It is an object of the present invention to overcome or substantially ameliorate at least one of the above disadvantages.

It is another object of the invention to address at least one of the aforementioned needs.

SUMMARY OF THE INVENTION

According to a first aspect of the invention, there is provided a method of storing heat energy in a body of graphite at an elevated temperature and recovering the heat therefrom, comprising heating an inner region of the body of graphite when it is required to store the heat energy and recovering the heat when required.

By heating the inner region of the body of graphite, the amount of energy transferred to the graphite is increased. This also has the advantage that energy losses can be minimized, not only because the operating temperature of the outside surface of the body of graphite may be lower for the storage of a given amount of energy to be stored, but also because cheaper or more effective thermal insulation materials can be utilised.

The body of graphite may be subdivided into separate parts, layers, sections or regions that may be arranged in one, two or three dimensions to be located around the inner region that is heated. Thus, the invention also envisages heating two or more bodies of graphite from surfaces or ends which are, in use, arranged around a region which constitutes an inner region of a combination of the bodies. There may be 1, 2, 3, 4, 5, 6, 7, 8, 9, 10 or more bodies, parts, sections, layers or subdivisions.

The subdivisions, bodies, parts, sections or layers may be arranged the inner region in such a manner that they are in thermal communication with one another. Thus, adjacent or neighbouring bodies may be in contact with one another. To improve heat transfer between adjacent bodies, parts, sections, layers or subdivisions, neighbouring or adjacent bodies or parts or subdivisions may abut.

The subdivisions, bodies, parts, sections or layers may be adapted to be held together in an assembly. The assembly may be adapted to be taken apart and reassembled easily for maintenance purposes. The graphite body may be in the shape of a cube, a triangular prism, a pentagon shaped prism, a hexagonal prism, an octagonal prism, a rectangular block or prism, a sphere, an ellipse, an ovoid, a cylinder, a cylindrical prism, an irregular prism, a regular prism or any other suitable shape.

According to a second aspect of the invention, there is provided a method of storing heat energy in a plurality of bodies of graphite at an elevated temperature and recovering the heat energy therefrom, comprising the steps of heating an inner region of an assembly of the bodies of graphite when it is required to store the heat energy and recovering the heat energy therefrom, when required.

The method may include the step of passing an electric current through a resistor which may be disposed in the inner region of the body or assembly of graphite or alternatively in heat transfer relationship therewith, so as to cause its temperature to rise. There may be 1, 2, 3, 4, 5, 6, 7, 8, 9, 10 or more resistors.

The or each resistor may form part of an electric circuit which may be connected to the mains system during off-peak times and which may be disconnected from the mains system when the demand is at or close to its peak. Alternatively or additionally, the resistor may be connected or connectable to an electrical circuit which may be energised by an electricity supply recovering electrical energy from a renewable energy source.

The or each resistor is preferably connected to the electrical circuit or to the supply of electricity by means of one or two connectors. The or each connector is preferably made of a metal such as steel or copper. In order to avoid deterioration of the resistor the electrical contacts are preferably made of the same material preferably from copper. Caution should be taken to avoid high current loadings with the electrical connections at elevated temperatures.

Alternatively or additionally, the body of graphite material may be heated using heat recovered from an energy source which may be renewable.

The method according to the invention includes the step of recovering heat energy from the body of graphite material, when required. The recovered heat may be used as heat energy itself or for conversion to electricity. The heat energy may be recovered by transferring it to a solid or a fluid.

The heat may be recovered from the body of graphite material by means of a heat exchanger locatable at least partially inside or in proximity to the body of graphite material. In the event that the resistor is located outside the body of graphite material, the same or a different heat exchanger may be used to transfer heat generated by the resistor to the body of graphite material. To reduce heat losses from the body of solid graphite material, the method according to the first aspect of the invention may also include the step of insulating the body of graphite material and containing it in a controlled environment.

According to a third aspect of the invention, there is provided an apparatus for storing heat energy in a body of graphite material at an elevated temperature, comprising means for heating an inner region of the body of graphite material.

According to a fourth aspect of the invention, there is provided an apparatus for storing heat energy in a plurality of bodies of graphite material at an elevated temperature, comprising means for heating an inner region of an assembly of the bodies of graphite material.

The means for heating an inner region of the body of graphite material or the assembly may comprise:
  a resistor;
  means for passing an electric current through the resistor so as to cause its temperature to rise; and
  means for transferring heat generated by the resistor to the body of graphite material.

The resistor may be adapted to be connected to an electric circuit for passing the electric current through the resistor. The electric circuit may be connected to a mains power supply or to any source of electricity produced from renewable energy.

As stated above, the body of graphite may be subdivided into separate parts, layers, sections or regions that may be arranged in one, two or three dimensions to be located around the inner region that is heated. Thus, the invention also envisages heating two or more bodies of graphite from surfaces or ends which are, in use, arranged around a region which constitutes an inner region of a combination of the bodies.

In one embodiment, the body of graphite material or the assembly comprises a core and one or more layers, parts, sections or blocks surrounding or enveloping the core. Successive layers, etc and the core may be thermally insulated from one another.

An operating temperature in the core may be higher than an operating temperature in the first layer surrounding it, which may in turn be higher than an operating temperature in the next layer and so on.

The operating temperature of the core may exceed a recommended operating temperature of material of construction used in association with the first layer of graphite material surrounding the core of the body of graphite.

As an example, the operating temperature of the core and optionally one or more of the surrounding layers of the body of graphite material may exceed 900° C., whilst the operating temperature of the outer layer is maintained below 900° C. so as to allow the use of materials of construction that are unable to be operated at temperatures exceeding 900° C.

The operating temperature of the apparatus and method of the invention may exceed 300° C. It preferably exceeds a temperature of 800° C. More preferably, it exceeds 1500° C., still more preferably it exceeds 2000° C. to achieve maximum energy storage density. The operating temperature of the apparatus and method of the invention may be in the range 300° C.-2400° C., 1000° C.-2400° C., 1500° C.-2400° C., 1900° C.-2400° C. or 2400° C.-3000° C.

It has been found that, the higher the operating temperature, the more heat energy can be stored in graphite, as is shown in Table 1. The data contained in Table 1 is graphically represented in FIG. 7.

TABLE 1

| GRAPHITE ENERGY STORAGE CAPACITY | | |
| --- | --- | --- |
| Storage Temperature (° C.) | Energy Stored per tonne (MWh) | Energy Stored per m³ (MWh) |
| 2400 | 1.17 | 1.88 |
| 2200 | 1.11 | 1.78 |
| 2000 | 1.04 | 1.67 |
| 1800 | 0.97 | 1.55 |
| 1600 | 0.88 | 1.41 |
| 1400 | 0.78 | 1.25 |
| 1200 | 0.67 | 1.07 |
| 800 | 0.41 | 0.66 |
| 625 | 0.30 | 0.47 |
| 500 | 0.22 | 0.35 |
| 485 | 0.21 | 0.33 |
| 300 | 0.11 | 0.17 |

The body of solid graphite material is conveniently selected such that its thermal conductivity is as high as possible. The thermal conductivity at 1000° C. of the material preferably exceeds about 80 W/m° K more preferably, it exceeds about 100 W/m° K even more preferably, it exceeds about 200 W/m° K. The thermal conductivity at 1000° C. of the material may be between 80 W/m.° K-250 W/m.° K, 100 W/m° K-250 W/m.° K, 150 W/m.° K-250 W/m.° K, or 180 W/m.° K -220 W/m.° K for example.

The sublimation point of graphite at >3500° C. is conveniently above the proposed operating temperature of apparatus.

The high thermal conductivity, high sublimation point and low emissivity of graphite makes it the preferred material for purposes of heat storage.

The emmissivity of the graphite (which is defined as the ratio of the energy radiated by a surface of a body of material to that radiated by an ideal black body at the same temperature and with the same area) is conveniently selected or reduced by suitable purification processes for the graphite such that it is as low as possible. It is preferably below about 0.3. Preferably it is in the range of 0.3 to 0.05 or 0.3 to 0.1 or 0.3 to 0.15.

It is preferable to prevent oxygen from getting into contact with the graphite material at high temperature, because of the risk of combustion. It has been found that at temperatures exceeding about 300° C., the surface of the graphite starts to become active and reacts with any oxygen that may be present. For that reason, the apparatus in accordance with the invention preferably also copmrises an enclosure adapted to contain the graphite material in an atmosphere of a non-oxidising gas or in a vacuum.

The graphite may be synthetic or natural. The graphite is preferably selected such that it contains as little mineral impurities as possible. The use of high purity crystalline graphite is preferred, for example graphite having a purity of from 95 weight % to 99.9 weight %, as higher energy storage densities are possible when graphite having a high purity is used. In addition, low emissivity is a characteristic of crystalline graphite. Graphite having a purity of 90-99 weight %, more typically from about 93 weight % to about 98 weight %, still more typically about 95 weight %, 96 weight %, 97 weight %, 98 weight % or 99 weight %, may be used with excellent results. For best results, the graphite may be of very high purity, for example up to 99.99 weight % purity, which is preferably crystalline.

High purity graphite having a bulk density of at least 1.5, typically 1.75, and preferably from about 2.1 to about 2.2, is suitable for use as the storage medium. Preferably high purity graphite having a bulk density in the range of 1.5 to 2.2, 1.6 to 2.2, 1.7 to 2.2, 1.8 to 2.2, 1.9 to 2.2 or 2.0 to 2.2 is used.

The graphite may be solid graphite or compressed graphite or compressed granular graphite. A single block of graphite may be used or two or more smaller blocks may be used, whilst ensuring that each block makes efficient thermal contact with adjacent blocks when brought into contact with them. In this embodiment, the smaller blocks may suitably be held in contact by passing graphite fibres around or through the blocks and tensioning the graphite fibres. Alternatively, crude graphite which occurs naturally and is mined commercially, may be used for the fabrication of the body of solid material. Blocks of crude natural graphite as mined, typically about 90 weight % graphite, may, for example, be heated in vacuo to about 2200-3000° C., more typically to about 2400° C., until essentially no further volatiles are evolved, which typically provides graphite of at least about 95 weight % purity, which may be used in the method and apparatus of the invention.

The purity of the graphite material selected for the present invention is important because impurities affect its conductivity. The purity also has an effect on the service life of the apparatus in accordance with the invention. In the case of graphite, its purity may be expressed as % ash on total combustion. For an apparatus in accordance with the invention to have an acceptable life span, it is considered advisable for the graphite to have an ash content of less than about 5wt %, preferably below about 4%, 3%, 2%, or 1.0%, more preferably below about 0.6%, especially below about 0.3%.

As a further alternative, a body of graphite may be manufactured in situ by forming a body of a suitable carbonaceous material and heating the carbonaceous material under a reducing or inert atmosphere to graphitise the carbonaceous material. Suitable carbonaceous materials for this purpose include those materials of a relatively high carbon content which are solid or semi-solid. Examples are amorphous carbon, tar, bitumen, pitch, asphalt, coal, petroleum coke and sucrose. The body of carbonaceous material may be reinforced with carbon fibres or with carbon cloth. Thus, a typical method for preparing a block of graphite comprises the steps of (i) preparing a mixture of pitch or other binder and graphite powder, (ii) softening the mixture by heating it, (iii) charging the softened mixture into a mould of the desired size and shape and charring the moulded block in a baking furnace up to 1200° C., (iv) transferring the moulded block to a heatable evacuatable enclosure, (v) evacuating the enclosure to an absolute pressure of 500 Pa or less, typically 100-500 Pa, (vi) heating the block gradually to a temperature of approximately 2200-2500° C., more typically approximately 2400° C. for 24-48 hours while maintaining the enclosure pressure at 500 Pa or less, typically 100-500 Pa, to graphitise the pitch or other binder, (vii) cooling the block, (viii) admitting air to the enclosure and (ix) removing the graphitised block.

Where the operating temperature of the apparatus is to exceed about 50° C., the body of graphite should preferably be thermally insulated from the environment so as to reduce the amount of heat losses thereto.

The body of solid graphite material may be spherically shaped and may be provided with a bore or well extending from its surface to its centre. Alternatively, the body of solid graphite material may have any other convenient shape such as a cube, a prism or the like, or it may have an irregular shape. It will be appreciated that the surface to volume ratio of the body of material should preferably be as low as possible, taking into consideration cost of material, costs of manufacture, costs of energy and the need to minimise heat losses from the body of material.

A bore or well may optionally be provided for embedding the resistor in the body of solid graphite material. The resistor may optionally be isolated from the body of solid graphite material by means of a layer of electrically insulating material provided between a substantial portion of the inner surface of the bore or well and the resistor, so as to reduce the proportion of the total electric current that flows through the side walls of the well to surrounding material forming part of the body of solid graphite material, and so as to ensure that most of the electric current flows through a desired region or area or proportion of the internal surface of the bore or well. This region may conveniently be located in a position within the body of solid graphite material and remote from the surface.

The apparatus may comprise an electrode, at least a portion of which may be connected to the resistor. The electrode may also be embedded in each bore or well. The bore or well may be at least partially filled with a high purity granular carbonaceous material thus forming the electrical resistor.

Each resistor may be isolated from the surrounding material by means of a suitable insulator which may be in the form of a tube, preferably a cylindrical tube, which may conveniently be made of an insulating material such as alumina or any other dielectric ceramic which can withstand the operating conditions of the apparatus.

The electricity supply may be dc or ac.

The apparatus may be operated such that the current density, as measured at each electrode resistor interface, is lower than about 0.5 watts/mm$^2$. It has been found that, the lower the ash content of the granular material, the higher the current density that can be tolerated by the apparatus. With a granular material having an ash content of less than about 0.6 wt %, a current density of as high as 0.7 watts/mm$^2$ can be achieved. These figures may vary depending on the environment in the jacket, chamber or enclosure.

The resistor may have a resistance to an electric current which, upon an electric current flowing through the resistor, causes the conversion of electric energy into heat energy. The resistor may be formed or located in the bore or well. The resistor may be electrically connected to an electrode which in turn may be connected to an electric circuit.

The resistor may be at least partially embedded in the bore or well which may contain a suitable material of elevated electrical resistance such as a carbonaceous material with an added substance having higher or a high electrical resistance. The added material of high electrical resistance may be selected from the group consisting of alumina, zirconia and other suitable oxide, carbide or nitride ceramics.

The first electrode may be made of conductive metal or graphite which may be in contact with, or inserted into or embedded in the resistor.

The resistivity of the first electrode material is preferably less than about 20 microohm.metres, more preferably less than about 10 microohm.metres, even more preferably, less than about 5 microohm.metres.

The apparatus may comprise a second electrode which may also be connected to the body of material via a second well or bore provided in the body of material and extending from its surface to substantially the centre thereof. Alternatively, the second electrode may be connected to at least a portion of the surface of the body of solid material. In this way, the flow path of electric current conducted between the first electrode and the second electrode may be selected such as to cause minimal electrical resistance through the body of material, whilst ensuring that heat is generated preferably as close as possible to the centre thereof.

By embedding the electrodes at least partially in carbonaceous material located in the bore or well, the electrodes may be moved in and out of the bore or well to an extent, without significantly deteriorating the electrical contact between the electrode and the carbon particles inside the bore or well.

It has been found that the diameter of the electrode in relation to its length is important in ensuring that heat that is conducted along the electrode and away from the body of material is minimised. The electrical resistance and thermal conductivity of the electrode is preferably low, whilst its mechanical strength is preferably sufficient to serve its purpose. The current density is preferably no more than about 1 W/mm$^2$ of cross sectional area of this electrode, more preferably no more than about 0.8 W/mm$^2$, still more preferably no more than about 0.5 W/mm$^2$.

Graphite tubes may be used to impart an electrical connection between the body of material and the electrodes. The graphite tubes may be attached to the body of material by means of a glue made of fine graphite bound with thermosetting resin.

It is desirable that the total surface area of each electrode be high enough to ensure that the density of the current passed through the electrode does not exceed about 0.5 watts/mm$^2$ surface area of the electrode, in the event that graphite is used and the ash content of the graphite is about 0.5 wt %. Where graphite having a lower ash content is used, a higher current density may be tolerated.

Where the temperature of a graphite body exceeds the temperature at which oxidation occurs, an inert atmosphere or evacuated chamber or enclosure as described above is preferably employed.

In another embodiment, an enclosure adapted to withstand a vacuum is provided, and the body of solid graphite material is suspended inside the enclosure in such a way as not to touch the enclosure. A vacuum is then applied in the space between the body of material and the enclosure. If desired, the space between the body of material and the enclosure may be filled with a blanket of non-oxidising gas. The vacuum is preferably applied to about 5-10 millibar.

The non-oxidising gas is preferably moisture-free, so as to reduce the possibility of the water gas reaction taking place between the moisture and the carbonaceous material at high temperature, resulting in the partial oxidisation of the carbonaceous material.

To reduce heat losses from the body of material to the environment, heat transfer by way of any one or more of conduction, convection and radiation may be impeded or restricted.

It has been found that the use of a vacuum between the body of solid material and the enclosure to reduce heat transfer by conduction and convection works well. Evacuation in combination with the use of a solid insulating material in the space between the body of material and the enclosure, may be used to reduce heat losses to acceptable levels. The insulating material is preferably fibrous. Alternatively, cenospheres, perlite, vermiculite, other thermal insulating granules, porous or foamed material as well as reflective layers may be used advantageously.

In order to reduce heat losses by conduction, the body of solid graphite material may be covered with one or more layers of a suitable insulating material. The apparatus may thus comprise one or more layers of thermal insulating material covering or disposed around the body of solid graphite material, the thermal insulating material being adapted to inhibit the loss of heat from the body of material. The thermal insulation is typically mineral or ceramic. At high temperatures, carbon or graphite based insulating material is required.

More typically, the apparatus comprises jacket, chamber or enclosure surrounding a block of graphite, and the jacket, chamber or enclosure contains an inert atmosphere or is evacuated internally.

In order to reduce heat transfer by radiation, reflective surfaces may be provided on the outer surface of body of solid material and on the inner surface of the enclosure. The inner surfaces of the jacket, chamber or enclosure are thus preferably highly polished to minimise radiative heat loss. For reasons of mechanical strength, cost and ability to withstand elevated temperatures, the jacket, chamber or enclosure is preferably made of a metal, preferably steel. When the jacket, chamber or enclosure is evacuated internally, the graphite body is separated from the jacket, chamber or enclosure by one or more insulating spacers. The insulating spacers may be one or more layers of a ceramics material, optionally separated by a layer of a metal, such as molybdenum, tungsten or refractory metal with stainless steel alloys or aluminium at lower temperatures. Examples of suitable ceramic thermal insulators include metal oxides such as beryllium oxide, magnesium oxide, calcium oxide, strontium oxide, osmium oxide, lanthanum trioxide, yttrium trioxide, scandium trioxide, titanium dioxide, zirconium dioxide, hafnium dioxide, tantalum pentoxide, niobium pentoxide, alumina, silica, nickel oxide, and other inorganic materials such as silicon nitride, silicon carbide, boron carbide, tantalum carbide, titanium carbide, tungsten carbide, zirconium carbide, aluminium nitride, zirconium boride, spinel, mullite, forsterite, fireclay, dolomite, magnesite, high-alumina porcelains, high-magnesia porcelains, sillimanite, kyanite, zirconium silicate and mixtures thereof. Foamed or fibrous forms of carbon or graphite could also be used.

The insulating spacers may alternatively comprise one or more layers of graphite-impregnated ceramic in thermal contact with a heat exchanger which separates the impregnated ceramic from the jacket, chamber or enclosure. In this arrangement, the heat exchanger can be maintained at a low enough temperature to minimise heat loss from the graphite body to the jacket, chamber or enclosure while, with suitable choice of graphite-impregnated ceramics, the body or body of graphite may be maintained at a very high temperature. Typically, the body or bodies of graphite within the jacket, chamber or enclosure operate at a maximum temperature of up to 2800° C. More typically, the body or bodies of graphite operate at a maximum temperature of about 1400° C. to about 2000° C., about 1400° C. to about 1950° C., about 1400° C. to about 1900° C., about 1400° C. to about 1800° C., about 1400° C. to about 1700° C., about 1400° C. to about 1600° C., about 1400° C. to about 1500° C. even more typically at a maximum temperature of about 1400° C., 1450° C., 1500° C., 1550° C., 1600° C., 1650° C., 1700° C., 1750° C., or 1800° C. During energy discharge, the temperatures may fall to 200 to 300° C. or 200 to 500° C.

The chamber or enclosure may be evacuated internally and then sealed so as to retain the internal vacuum, or it may be connected to a vacuum pump for maintaining the vacuum. Typically, where a vacuum pump is connected, the pump is arranged so as to operate only intermittently, for example when leaks cause the pressure in the chamber or enclosure to rise above a predetermined value. The vacuum in the chamber or enclosure is typically maintained in the range of from about 1 Pa absolute to about 500 Pa absolute, more typically on the range of from about 20 Pa absolute to about 250 Pa absolute, still more typically in the range of from about 50 Pa absolute to about 100 Pa absolute.

It will be appreciated that direct contact between any of the bodies of graphite and hot air or other oxidising gases is to be avoided when the temperature of those gases is such as to result in substantial oxidation of the body or bodies of graphite. The temperature at which such oxidation occurs depends on the purity of the graphite, but may be as low as 250° C. for impure graphitized carbon and 400° C. for pure natural graphite.

The method of the first aspect and the apparatus of the second aspect may thus utilise the high thermal conductivity of graphite and its unusually high specific heat at high temperatures to provide a system for the storage of heat energy.

The specific heat of any material is a function of the temperature of the material. The total heat energy H which is required to raise a body from an initial temperature $T_1$ to a final temperature $T_2$ may be expressed as $$H = \int_{T_1}^{T_2} c(t)\,dt$$

where c(t) is the specific heat of the body at temperature t.

When $T_2$ is higher than the ambient temperature of the surroundings of the body, the quantity of heat H or some part of it is available to do useful work. The relationship between the temperature of a mass of graphite and the amount of energy absorbed by the mass of graphite is such that at temperatures above approximately 600° C., the absorption of additional energy by the hot mass results in relatively little further warming, particularly in comparison to a material such as iron. Thus, a relatively high heat storage capability is exhibited by graphite. At a temperature of about 1600° C., for example, a 1 tonne mass of graphite stores approximately 3.6 GJ of energy more than it stores at 20° C. By comparison, the same mass of iron at the same temperature stores approximately 1.3 GJ (at which stage it is molten).

Furthermore, the high thermal conductivity of graphite ensures that local overheating of a mass of graphite is minimised. When energy is applied to a small region of a high purity graphite block the whole of the block is thereby heated almost uniformly. The thermal conductivity of graphite may also be exploited in the heat transfer means in the embodiments of the invention, by constructing the heat transfer means from graphite, or by otherwise utilising graphite in the heat transfer means as described above.

The source of electricity may be any convenient source, such as mains electricity, particularly where supply at lower-priced rates is available at times of low electricity demand. A similar strategy may be used by electricity suppliers in order to smooth the load demand on the electricity generators.

The source of the electricity may vary, and may include electricity recovered from renewable energy sources such as wind, hydro, wave, solar and tidal energy, of which the availability during some periods exceed the demand therefore, and of which the demand during other periods exceed the availability thereof. The duration of the periods of excess availability and periods of excess demand may be from about say 20 to 60 minutes to several hours, such as in the case of the peaks and valleys experienced in mains power demand, or they may be of longer duration such as from day to night, as in the case of the availability of solar power, or several days as in the case of wind and wave energy. Where an abundance of energy is available during say, one season, the storage of such energy in the form of heat from that season to another season in which it is required, may be considered using the teachings of this invention. Thus the heat energy stored in the bodies of the apparatus of the invention may be used at times of peak demand for heat or electricity.

In order to ensure that the electrical connections to the electrodes are maintained at a relatively low temperature, the electrical connections may be cooled by means of water circulating through jackets provided around them.

Examples of suitable ceramic thermal insulators which may be used include those exemplified herein above.

Additional electrodes may be used in order to ensure that the surface current density does not exceed about 0.5-about 1.0 watts/mm$^2$. Where the apparatus in accordance with the invention is to be used to store energy during off-peak periods, it is important that energy be transferred to and from the apparatus at a relatively high rate. Where two periods of peak consumption are experienced, for instance one during the early morning and the other during the evening, with off-peak periods in between, a relatively short period of say about two hours is available for storing energy, with another relatively short period of two hours for recovering it from the apparatus in accordance with the invention. This results in a need to use more material per kilowatt hour that has to be stored than where there is only one peak per day.

One advantage of an apparatus in accordance with the invention, is that it can be located where the electricity is consumed, rather than where it is produced, in view of the relatively pollution-free manner in which the apparatus in accordance with the invention may be operated.

Utilisation of heat energy can be achieved by converting it into electricity, by using it as such or by converting it into another form.

A range of technologies for the conversion of heat energy into electrical energy is in existence. These include, for example, magneto-hydro dynamics, Rankine cycle (organic or steam), Brayton cycle, thermionic generation, and thermophotovoltaic generation. The most common of these technologies is the generation of electricity using a steam driven turbine that in turn drives a power generator in the form of an alternator or a dc excitor. For this purpose, steam may be generated by evaporating water in tubes which may be brought in contact with a body of material in which heat has been stored in accordance with the invention. In order to improve the efficiency of recovery means associated with the apparatus of the invention, the steam may be superheated in superheater tubes which also may be brought into contact with a body of graphite material forming part of an apparatus in accordance with the invention. The heating tubes and superheating tubes may be the continuous tubes as are utilised in a "once through steam generator" system.

The invention thus extends to a plant for the production of electricity, optionally during peak times, comprising an apparatus in accordance with the invention, and means for evaporating a working fluid in tubes associated with the apparatus and adapted to recover heat stored in the apparatus, optionally during periods of peak consumption of electricity.

The apparatus may also comprise a turbine or engine adapted to be driven by a vapour generated in the evaporation means; and electric power generation means adapted to be driven by the turbine, for generating electric power. For efficient operation of the apparatus, the condition of the working fluid may be maintained substantially constant.

According to a fifth aspect of the invention, there is provided a method of storing heat and generating electric power from such stored heat, including the steps of storing heat energy as hereinbefore disclosed, recovering such stored heat energy when required and converting said recovered heat energy into electrical energy.

The recovering step may include evaporating a working fluid from a liquid phase to a vapour phase. It may also include superheating the vapour phase.

The converting step may include the steps of driving a turbine using the vapour phase of the working fluid and generating electricity in a generator driven by the turbine.

According to a sixth aspect of the invention, there is provided a heat storage and electric power generation plant comprising an apparatus for storing heat energy as hereinbefore disclosed, means for recovering heat energy stored therein and means for converting said recovered heat energy into electrical energy.

The means for recovering heat energy from the apparatus for storing heat energy may comprise an evaporator for evaporating a working fluid from a liquid phase to a vapour phase.

The means for converting said recovered heat energy into electrical energy may comprise a turbine driven by the vapour phase of the working fluid, and a generator adapted to generate electricity.

According to a seventh aspect of the invention, there is provided a method of storing heat energy in a body of graphite at an elevated temperature, comprising the steps of heating an inner region of the body of graphite when it is required to store the heat energy and recovering the heat by way of a heat exchanger, when it is required to be used.

According to an eighth aspect of the invention, there is provided an apparatus for storing heat energy in a body of graphite material at an elevated temperature, comprising means for heating an inner region of the body of graphite material and means for recovering heat therefrom, wherein the means for heating the inner region of the body of graphite material comprises a resistor and means for passing an electric current through the resistor so as to cause its temperature to rise and the means for recovering comprises a heat exchanger adapted to contain a heat exchange fluid.

According to a ninth aspect of the invention, there is provided a heat storage and electric power generation plant comprising an apparatus for storing heat energy as hereinbefore disclosed.

According to a tenth aspect of the invention, there is provided a apparatus for storing heat as hereinbefore disclosed, comprising a first block of graphite and at least one additional block of graphite wherein the first block of graphite is thermally insulated from the or each additional block of graphite.

According to an eleventh aspect of the invention, there is provided a temperature compensated heat storage and recovery system, comprising
- a first body of solid graphite material adapted to store heat energy at an elevated temperature;
- a first heat exchanger in heat exchange relationship with the first body of solid graphite material for recovering heat energy therefrom;
- a first working fluid circuit operatively connected to the first heat exchanger for conducting a working fluid from a source thereof via the first heat exchanger to a device where a portion of the heat energy of the working fluid can be utilised;
- a second body of solid graphite material adapted to store heat energy at an elevated temperature;
- a second heat exchanger in heat exchange relationship with the second body of solid graphite material, whereby a combined heat exchange area of the first and second heat exchangers may be increased to compensate for a temperature drop in the first and second bodies of graphite;
- a second working fluid circuit operatively connected to the second heat exchanger for conducting the working fluid from the source thereof via the second heat exchanger to the device where a portion of the heat energy of the working fluid can be utilised, the second working fluid circuit comprising a control valve adapted to be opened and closed; and
- a control system adapted to compensate for a reduction in heat recovered from the first body of solid graphite material as a result of a drop in the temperature thereof, by causing working fluid or a larger amount thereof to be admitted to the second heat exchanger via the second working fluid circuit utilising the increased combined heat exchange area for transfer of heat.

The system may optionally comprise one or more additional body or bodies of solid graphite material, adapted to store heat energy at an elevated temperature, and may also comprise one or more additional heat exchangers in heat exchange relationship with the additional body or bodies of solid graphite material, and one or more additional working fluid circuits operatively connected to the additional heat exchangers, for conducting the working fluid from the source thereof via the one or more of the additional heat exchangers to the device where a portion of the heat energy of the working fluid can be utilised, the or each additional working fluid circuit comprising a control valve adapted to be opened and closed.

Thus, the system may comprise 3, 4, 5, 6, 7, 8, 9, 10, 11, 12, 13, 14, 15, 16, 17, 18, 19, 20, 25, 30, 35, 40, 45, 50 or more additional heat exchangers and heat storage blocks or pairs or sets of blocks. Each heat storage block or pair or set of heat storage blocks may be associated with a corresponding heat exchanger or pair or set of heat exchangers, so as to permit the system to be made as a modular system which can be manufactured in unitary form so as to facilitate construction and/or extension of a system in accordance with the invention.

The heat may be recovered in the form of latent and/or sensible heat transferred to the working fluid. The transferred heat in the form of gas or liquid vapour may be utilised to drive a turbine. The working fluid may be water.

According to a twelfth aspect of the invention, there is provided a method of compensating for a decrease in the temperature of a heat storage medium, when recovering heat therefrom, comprising
- storing heat at an elevated temperature in a first body of solid graphite material;
- recovering heat energy from the first body of solid graphite material by heating a first working fluid in a first heat exchanger in heat exchange relationship with the first body of solid graphite material;
- conducting the first working fluid, in a first working fluid circuit, to a device where a portion of the heat energy of the working fluid can be utilised;
- storing heat at an elevated temperature in a second body of solid graphite material;
- recovering heat energy from the second body of solid graphite material by heating a first working fluid in a second heat exchanger in heat exchange relationship with the second body of solid graphite material;
- conducting the second working fluid, in a second working fluid circuit, to a device where a portion of the heat energy of such working fluid can be utilised; and
- compensating for a reduction in heat recovered from the first body of solid graphite material as a result of a drop in the temperature thereof, by causing working fluid or a larger amount thereof, to be heated in the second heat exchanger.

The tubes of the or each heat exchanger may be in direct contact with the body of solid graphite material, and may be arranged in substantially parallel relationship on its surface. Alternatively, the tubes of the or each heat exchanger may be clamped between two adjacent blocks.

In the event that the heat exchanger or any part thereof, such as the tubes, in this and other embodiments of the invention, is(are) made of steel, and in the event that the heat exchanger(s) are in direct contact with graphite at a high temperature, the steel may be carburised by carbon molecules migrating from the hot graphite into the surface of the hot steel.

To avoid carburisation of the steel, a suitable conductive material may be placed between the tubes of the heat exchanger(s) and the graphite.

For temperatures up to 800 or 900° C., high nickel steel alloys may be used as material of construction of the heat exchanger(s).

To facilitate assembly as well as to simplify inspection and maintenance of the heat exchanger(s), any one or more of the bodies of solid graphite may be provided with a cavity, which may be provided in the block or which may be formed between portions or segments of a separable or removable insert or subassembly, to enable one or more heat exchangers accommodated in the cavity to be removed and replaced.

The method according to the invention may be used for capturing and storing energy in the form of heat derived from various sources. The input energy to the storage apparatus may be electricity to resistive heating elements, solar energy in the form of a concentrated light beam(s) or waste heat from an industrial process. In the event that the energy is electrical, the input could be from grid connected power, to take advantage of the price differentials across the supply period, or from renewable sources such as wind turbine or air flow powered electrical generators, photovoltaic cells or wave or tidal flow electrical generators.

The energy stored in the apparatus of the invention could be utilised in various technologies that use heat as the motive force. The simplest is to use the storage apparatus as a boiler producing steam for various process uses. To generate electricity, the thermal energy may be used to heat a working fluid to drive a turbine/generator or a motor/generator. Hot gas may be used as the motive force for a gas turbine or combustion motor generator. Alternatively, Magnetohydrodynamic (MHD) generation, Thermionic Emission generation or Stirling Engine/generation could be used. The apparatus may be used as a preheater for the fuel or combustion air for a gas turbine or internal combustion motor/generator. The simplest commercial generation option is to use the storage apparatus to generate steam to drive a turbine/generator or a motor/generator.

Working Fluid

The working fluid may be water that may be evaporated to form steam. As an alternative to water/steam, a range of other working fluids may be used to transfer heat or to power a turbine or motor. The working fluid may be a gas, a liquid or a solid at room temperature as long as it is melted and/or vapourised within the thermal storage operating temperature range. A liquid working fluid may be selected from an alcohol such as methanol, ethanol or isopropanol, a hydrocarbon such as ethylene, or a metal such as mercury.

In the event that the working fluid is a solid at room temperature, it may be a salt such as lithium nitrate, a non metallic element such as sulphur or a metallic element such as bismuth, tin or antimony.

A specific working fluid may be selected for its heat capacity, its melting or boiling point relative to the thermal storage operating temperature range or its lack of corrosive and fouling effects on the heat exchanger material. When water is used with stainless steel or high nickel tube or pipe heat exchangers, the water is preferably of high purity, typically with a maximum foreign inclusion level of 50 parts per billion.

A gaseous working fluid may be selected from ammonia, nitrogen, an inert gas such as helium or argon, carbon dioxide or a hydrocarbon gas such as butane or pentane.

Thermal Insulation for Thermal Storage

Insulation may be used to minimise heat loss from the body of graphite material. Heat transfer occurs through radiation, convection and conduction.

Radiative heat transfer may be ameliorated by reflecting the thermal energy back towards the core. Layers of reflective materials, such as refractory metals (eg molybdenum), graphite, stainless steels or any other materials that will operate at the required temperature, may be utilised as a reflective lining. It is usual, although not essential, to combine these reflective insulations with lightweight porous materials such as cellular, fibrous or loose packed granular forms of alumina, carbon, silica, zirconia, aluminosilicate, various alkali silicates, spinel or more typically a combination of many of these forms. These insulating materials may be in a rigid form such as a board, block or brick or in a flexible form such as a loose fibre or as a blanket form. The granular insulation may be alumina, silica, aluminosilicate, alkali silicate, alumina, granules, vermiculite, perlite, cenospheres or any other suitable porous granule.

Conduction may be overcome or ameliorated by a low bulk density of the insulation or by placing a number of voids or stagnant air or gas spaces. Convective transfer within the insulating layer may be minimised by closed cell insulation.

These three heat transfer modes have to be balanced to achieve the best thermal insulation design to minimise thermal losses. The final choice of insulating materials and the lining thickness depends on the temperature required to be contained and the heat losses that can be tolerated.

The maximum operating temperature rating for insulation depends on the conditions that the materials are operating in. The presence of oxidising or corrosive gases will reduce the reflectivity of the reflective insulations and hence their effectiveness. Graphite reflectors on a high vacuum can be effective up to about +3000° C. whereas typically fibrous insulating aluminosilicate refractories would normally be limited to around 1400° C. Fibrous, foamed or granular insulations all inherently have large surface areas and so they are prone to attack by gaseous agents.

Fibrous alumina can be used up to about 1600° C. and foamed carbon can be used up to around 3000° C. in certain applications. These materials may be used as the high temperature face of what is usually a composite lining with materials of lower refractoriness forming the layers through to the outside jacket, chamber or enclosure.

Metals for Heat Exchanger Tubes or Pipes

The heat exchanger used to extract energy as heat from the thermal storage apparatus may comprise tubes or pipes. Any form of metallic or non metallic material may be used as long as the vessel containing the working fluid can operate at the working fluid operating temperature range and pressure.

The heat exchanger may be metallic. The material to be utilised depends on the operating conditions including pressure and temperature of the working fluid, the surrounding thermal storage and the atmosphere. Pipes or tubes are preferably of seamless construction. The metal or metal alloy used in the construction of and in the design of the heat exchanger, is preferably able to meet the design requirements, and may be:

AS1210-1997: Pressure Vessels
AS4041-1998/Amdt. 1-2001: Pressure Piping
AS1228-1997/Amdt. 1-1998: Pressure Equipment—Boilers
ASME Boiler & Pressure Vessel Code—2004
ASME B31.1-2001: Power Piping
DIN En 13445-2002: Unfired Pressure Vessels as amended or similar relevant standards applicable at the time.

At the lower temperature end of use, the 300 series Stainless Steels could be utilised, including but not exclusively 304 (UNS # S30400), 316 (UNS # S31600), 321 (UNS # S32100), 347 (UNS # S34700), 309 (UNS # S30900), 310 (UNS # S31000), their derivatives and similar alloys Other stainless steels include 153MA (UNS # S30415), 235MA (UNS # S30815) and 353MA (UNS # S35315), their derivatives and similar alloys.

(The alloys 304, 321, 347 and 253MA are most suitable for steam applications where the maximum temperature that the pipes would experience would be 500° C., typically for steam turbine operation temperatures of <400° C.).

As the operating temperature increases then the metal requirement moves to the high nickel alloys such as the 600 and 800 series, including but not exclusively 600 (UNS # N06600), 601 (UNS # N06601), 602CA (UNS # N06025), 625 (UNS # N06625), 690 (UNS # N06690), 800 (UNS # N08800), 825 (UNS # N08825), their derivatives and similar alloys. There are also a range of other high nickel alloys in the Hastelloy range of alloys that include N (UNS # 10003), X (UNS # 06002) as well as specialist Haynes alloys such as HR-120 (UNS # N08120), HR-160 (UNS # N12160), 230 (UNS # N06230), 556 (UNS # R30556), their derivatives and similar alloys.

Alloys 600, 800H and Haynes 556 are most suitable for steam applications where the maximum operating temperature that the pipes would experience is 900° C., for a steam turbine operating temperature of around 500° C. The alloys listed here are in order of increasing maximum use temperature.

The following codes are suitable for selecting a material of construction for the heat exchanger tubes: ASME B31.1-2001: Power Piping code, and ASME Boiler & Pressure Vessel Code-2004.

The maximum temperature allowable in the boiler tubes is also dependent on the pressure that they would experience.

Typically for any given alloy, as the operating pressure for the contained fluid increases, the maximum temperature of use decreases. Tables that outline these changes are contained within ASME B31.1-2001: Power Piping or relevant equivalent standards.

Control Philosophy

Atmosphere

The body of graphite may be located in a chamber or enclosure. A protective atmosphere is used in the chamber or enclosure so that the graphite is protected from oxidation. This can be achieved by maintaining a partial vacuum and/or by using a non combustible gas such as nitrogen or one of the inert gases such helium or argon.

A low positive pressure gas should be maintained inside the chamber or enclosure, within desired limits. The pressure may have a set point from about 2 barA down to millibar level. The pressure may be maintained in a range of +or −50% of the set point value but preferably down to +or −1% or less. The ramping of the control of the pressure is typically achieved using a PID controller (proportional-integral-derivative feedback control).

The atmosphere in the chamber or enclosure may be non combustible gas such as nitrogen or one of the inert gases such helium or argon, depending on the particular pressure that is to be maintained. As the required pressure is reduced, the structural strength of the chamber or enclosure needs to be increased.

In one example an operating pressure of 5 to 15 milli-bar may be used. If the pressure is lowered to about 1 milli-bar corona discharge becomes a problem around the electrical connections. However, if the operating pressure is dropped further, to about 900 micro-bar, corona discharge can be avoided.

When the pressure is increased above atmospheric pressure the structural strength of the chamber or enclosure also needs to be increased. To minimise the structural strength requirement for the thermal storage chamber or enclosure, the operating pressure can be maintained just over atmospheric pressure. The atmosphere is preferably non combustible or inert in nature and is preferably maintained at a pressure just over atmospheric pressure so that the ingress of oxygen can be minimised or avoided.

During operation, the pressure in the chamber or enclosure varies due to the expansion and contraction of the contained atmosphere. Pressure control is achieved by monitoring the pressure within the jacket, chamber or enclosure and by opening an exhaust valve when the pressure reaches a specific maximum set point or by opening the atmosphere gas supply valve to the chamber or enclosure when the pressure drops to the minimum pressure set point.

The pressure is typically maintained between 200 PaG and 400 PaG.

Thermal Storage & Heating System

The block of graphite is preferably heated in its centre, preferably with one or more layers of graphite around the centre and two or more (layers of) heat exchanger module blocks around the centre. The layers may be interleaved with insulation. The type and thickness of the interleaved layers of insulation between the storage and heat exchanger block layers depend on the temperature of the thermal storage, the rate of extraction of thermal energy and the required temperature profile.

The apparatus is operated so that power is applied to the heating elements until a desired operating temperature is reached. Once this temperature is reached, power to the elements is turned off and not turned on again until the temperature drops to a minimum set point. The ramping of the rates of application of power is typically achieved using a PID controller (proportional-integral-derivative feedback control).

The maximum storage temperature is dictated by the temperature that the metallic heat exchanger can safely be operated at. A thermocouple may be provided to measure the temperature. It may be located adjacent to the heat exchanger to ensure that the maximum operating temperature is not exceeded.

The centre of the graphite block, where the heating elements are, may be heated to a maximum temperature when energy is being withdrawn from the block, as advantage can be taken of the gradient in temperature, that arises across the insulated layers of storage and heat exchanger blocks between the heating elements and the heat exchanger.

Heat Exchanger & Storage Block

The materials to be used for the heat exchanger will depend on the working fluid, the fluid operating pressure and the fluid temperature. A typical working fluid is water/steam although this should not be considered as the only option. The use of gases or organic working fluids to drive a closed cycle turbine is also envisaged by the invention.

Typically the working fluid for a thermal storage apparatus connected to a steam turbine is water/steam at pressures from 10 to 100 bar. This steam is produced from the heat exchanger embedded in a part of the thermal storage apparatus that is at a temperature of up to 900° C. The usual requirement for process steam is typically, but not exclusively, 6 to 10 bar saturated steam. The heat exchanger used to recover energy from the thermal storage is typically a metallic once through steam generation type system (OTSG) where the number of heat exchanger tubes brought into use may be varied to meet the required output. As the temperature decreases in one section of the block, another section of the block may be used to generate superheated steam and the depleted area may act as a preheater for the superheat section. This type of boiler may be described as a Staged OTSG, with a first stage for Sub Saturation heating and a second stage for steam making up to superheated temperatures. No steam drum may be provided between these two stages. By following this practice, the amount of energy that can be extracted from the storage may be maximised.

Two or more storage blocks and two or more heat exchanger blocks may be provided. Any one may have sufficient heat exchanger length to run the STG. When possible, steam extracted from the turbine steam flow may be used to preheat the feedwater to temperatures approaching the saturation temperature for the particular operating pressure. In operation, at least one of the blocks needs to be at the highest temperature possible, so at least one block would always be kept hotter, in preference to heating them both to an equal temperature.

The block temperature will dictate how many heat exchanger tubes can be brought into operation for sub saturated water heating or steam production. The number of tubes in operation at any time is dependent on the throughput required and the temperature differential between the graphite and the working fluid. The number of tubes or pipes utilised may vary 5 or 20 fold or more over the operating temperature range. A minimum number of tubes or pipes may be utilised when the temperature differential is greatest but as this differential decreases the area of heat exchange would need to increase.

As the two blocks are at different temperatures, they may be operated at different pressures. The higher pressure, lower temperature block may be connected to the higher temperature block through a pressure reducing valve. The pressure reducing valve, with the set pressure controlled by the STG requirements, may control the pressure in the second, higher temperature block.

The following are a few design options as to how the heat storage apparatus could be operated:

Option 1

One block could habitually be used as a cooler block to preheat water for a hotter block. In this way, the energy extraction could be maximised. This strictly speaking breaks the OSTG principle of operation but is the simplest option as well as being the most straight forward control option.

Option 2

Another option is to have a central core in the storage raised to a high temperature, typically around 1000° C. The core may have insulation separating it from outer layers or blocks containing heat exchangers. As there may be at least a minimum drawdown of energy from the apparatus the temperature in the heat exchanger section is expected to be self regulating. There may also be a second layer around the inner heat exchanger layer that may be operated at a lower temperature. Heat would first be withdrawn from the outer heat exchanger until the block is unable to produce steam of sufficient quality.

The outer heat exchanger may then be used to preheat water for the inner heat exchanger. The other one of the storage blocks may alternately be used as preheater for the higher temperature one. An advantage of this design is that the block surface near the outer edge of the storage may be at a lower temperature and hence the chamber or enclosure skin temperature will be lower, so reducing the thermal losses.

Attemperation and Steam Quality

The mass flow rate is maintained by monitoring the feedwater flow rate and the temperature on the feed water line. One feedwater pump maybe used for both the feedwater for the thermal storage boiler and the desuperheater water. The total flow rate may be set by the feedwater control valve whilst the desuperheater control valve may control the proportion of this feedwater that is used by the desuperheater. This means that the variable quality steam from the thermal storage may be supplied at a constant quantity and quality to the process requirement or the motor or turbine.

The required steam mass demand for the process, motor or turbine is determined and then this setting is maintained at the feedwater pump. The proportion of this water going to the attemperator is determined by the temperature of the steam leaving the heat exchanger. The desuperheater flow rate increases when the temperature of the steam from the thermal storage increases. The quantity of steam produced by the heat exchanger may vary depending on how many heat exchanger pipes are operating the storage block temperature.

Steam Production

The storage block may be used for steam production. The steam produced by the heat exchanger will vary depending on how much heat exchanger area is utilised and the storage block temperature. After leaving the heat exchanger the steam is attemperated, typically with near saturated, to the required steam conditions.

Steam Turbine Operation

Typically a high efficiency steam turbine operates at around 500° C. and about 60 bar pressure.

The steam temperature required by the steam turbine may be maintained by attemperation of the steam leaving the thermal storage apparatus before it reaches the steam turbine.

BRIEF DESCRIPTION OF THE DRAWINGS

Preferred forms of the present invention will now be described by way of example with reference to the accompanying drawings wherein.

DETAILED DESCRIPTION OF THE PREFERRED EMBODIMENTS

Figure 1:
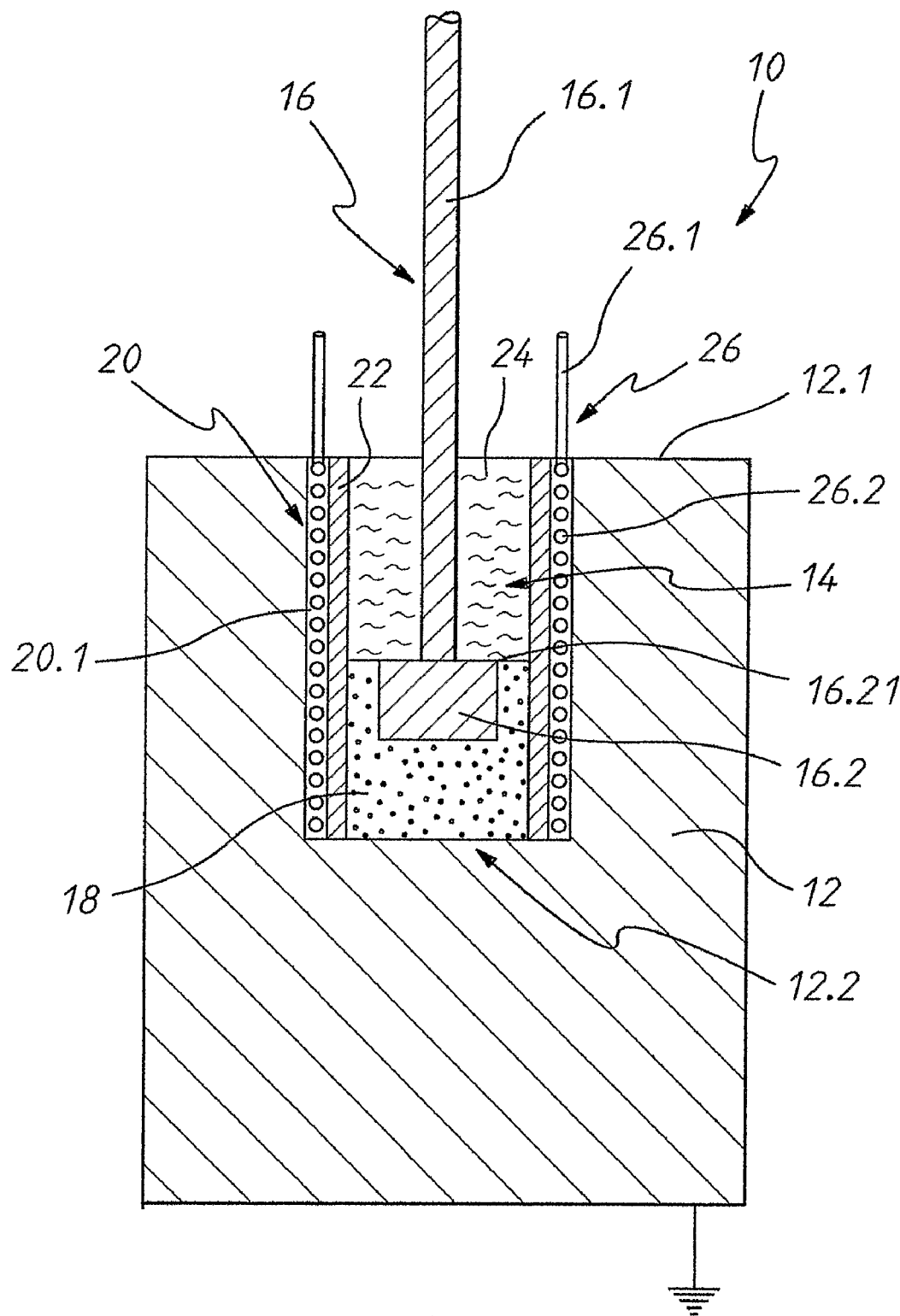
FIG. 1 is a diagrammatic representation of one embodiment of an apparatus in accordance with the invention.

Referring to FIG. 1, there is shown one embodiment of an apparatus 10 for storing heat energy. The apparatus 10 comprises a body 12 of high purity graphite containing less than 0.5% by weight of impurities. The apparatus 10 further comprises means 14 for transferring heat to the body 12, the means 14 comprising an electrode 16 and a resistor 18. The resistor 18 is located inside the bore or well 20 which extends from the top surface of 12.1 of the body 12, to a point 12.2 within the body 12 which is remote from the surface thereof.

A ceramic tube 22 fits into the bore or well 20. Its diameter is, however, smaller than that of the bore or well 20, leaving an annular space 20.1 between the outer surface of the tube 22 and the inner surface of the bore or well 20.

The electrode 16 comprises a stem portion 16.1 and a base portion 16.2. The base portion 16.2 is embedded inside a mixture of granular graphite or carbon and with or without ceramic granules which constitutes the resistor 18. Thermal insulation 24 covers the space between a top surface 16.21 of the base portion 16.2 and the surface 12.1 of the body 12. Further thermal insulation (not shown) may be provided on the top surface 12.1 of the body 12, in order to prevent heat loss from the body 12 to the environment.

The apparatus 10 also comprises means 26 for removing or extracting heat from the body 12, the means 26 being located partially inside the well 20, in the annular space 20.1. The means 26 is in the form of a tube 26.1 shaped in the form of a helical coil 26.2. In use, electrical energy is conducted to the apparatus 10 via the stem portion 16.1 of the electrode 16. Electricity is transferred from the base portion 16.2 to the mixture of granular graphite or carbon and with or without ceramic granules which constitute the resistor 18. By virtue of the resistance of the resistor 18, heat is generated when electricity flows through the resistor 18. The heat is conducted away from the resistor by the body of high purity graphite 12. When it is required to extract heat from the apparatus 10, water is passed through the tube 26.1. For as long as the temperature of the body of high purity graphite material 12 is higher than that of the fluid passed through the tube 26.1, heat will flow from the body of graphite 12 to the fluid. The fluid may be water and it may be converted to steam which may be superheated steam, when it passes through the tube 26.1.

Figure 2:
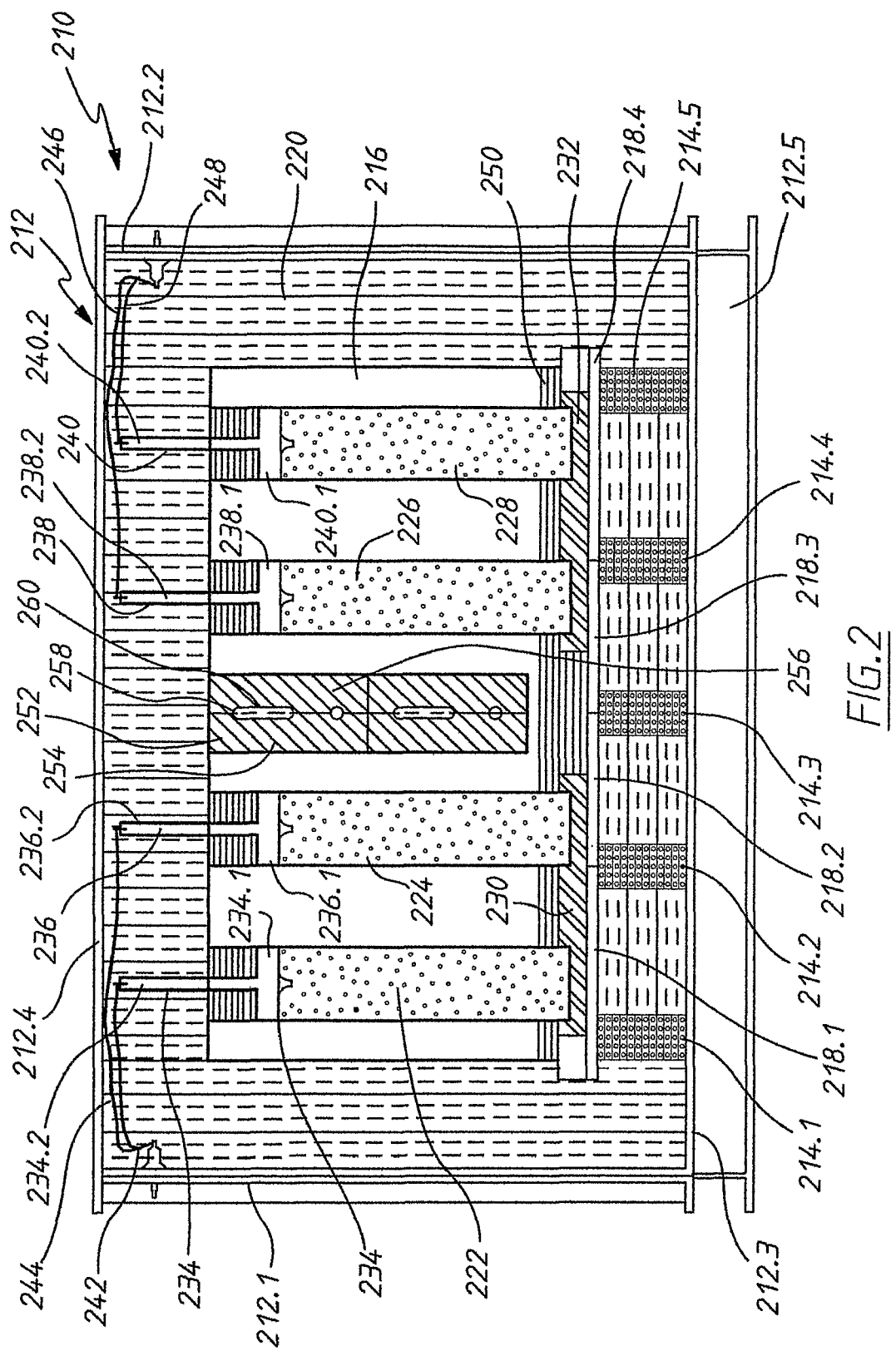
FIG. 2 is a diagrammatic representation of another embodiment of an apparatus in accordance with the invention.

Referring to FIG. 2, there is shown another embodiment of an apparatus in accordance with the invention, in the form of a thermal storage block assembly 21 0. The thermal storage block assembly 210 comprises a box-shaped external steel casing 212 having a left side 212.1, a right side 212.2, a bottom 212.3 and front and rear sides (not shown). A lid 212.4 covers the top. The bottom 212.3 is supported by a pair of beams 212.5 so that the apparatus 210 can be easily transported by means of a forklift truck.

Inside the external steel casing 212, five ceramic supports 214.1, 214.2, 214.3, 214.4, 214.5 are provided for supporting a solid block of high purity crystalline graphite 216 for storing heat energy. The storage block 216 is generally of rectangular cross section. The storage block 216 is separated from the ceramic supports 214.1, 214.2, 214.3, 214.4, 214.5 by means of four ceramic insulation tiles 218.1, 218.2, 218.3, 218.4 laid over the top surfaces of the ceramic supports 214.1 to 214.5. For the sake of convenience and ease of manufacture, the storage block 216 may be made up of smaller blocks (not shown), finished to close tolerances so that they can be maintained in sufficiently close contact, when stacked together, to distribute rapidly any thermal energy introduced into or to be removed from the block 216.

When in use, the external steel casing 212 and its contents may be subjected to a slight positive internal pressure by means of an inert gas admitted into the interior of the external steel casing 212.

Thermal insulation material 220 is provided in layers packed between the outer surfaces of the thermal storage block 216 and the sides 212.1, 212.2, the bottom 212.3 and the lid 212.4 of the steel casing 212, to prevent or at least reduce the amount of heat energy lost to the environment. The thermal insulation 220 is provided in layers of a suitable material which can withstand temperatures up to the operating temperature of the apparatus. In the range to 1300° C., material such as "Kaowool" or "Fiberfrax" may be utilised. Above 1300° C., in the higher temperature zone close to the graphite storage medium, other insulation materials based on graphite or oxide, nitride or carbide based felts can be used for temperatures up to 3000° C. A combination of these materials may be used such that the interface temperature between the layers is matched to their designed maximum operating temperatures.

The thermal storage block 216 may be heated, when required, by means of four resistors 222, 224, 226 and 228.

Each of the resistors 222, 224, 226, 228 is made of a high purity granular carbon composition, compacted into a bore provided in the storage block 216, that extends from its top surface to its bottom surface. At the bottom of the storage block 216, two electrical connectors 230, 232 are provided to interconnect the resistors 222, 224 and 226, 228 respectively. The electrical connectors 230, 232 are made of a suitable conducting graphite which can withstand temperatures up to 3000° C. The electrical connectors 230, 232 are in electrical contact with the lower ends of the resistors 222, 224 and 226, 228 respectively. The carbon containing material is compacted into the bores of the storage block 216 so as to form the resistors 222, 224, 226, 228, the top surface of each of which is respectively covered by a terminal 234, 236, 238, 240 resting on the respective top surface. Each terminal 234, 236, 238 and 240 comprises a base portion 234.1, 236.1, 238.1, 240.1 and a central terminal rod 234.2, 236.2, 238.2, 240.2 connected to the centre of the respective base portion 234.1 through 240.1, and extending vertically into the insulation 220 provided between the top surface of the storage block 216 and the lid 212.4. Electrical conductors 242, 244, and 246, 248 are respectively connected to the central terminal rods 234.2, 236.2, 238.2, 240.2 of the terminals 234, 236 and 238, 240. Because the central terminal rods 234.2, 236.2, 238.2, 240.2 extend into the insulation 220, their distal ends are, in use, operating at a lower temperatures than their respective base portions 234.1, 236.1, 238.1, 240.1.

The underside 216.1 of the storage block 216 is electrically insulated from the electrical connectors 230, 232 by means of an electrical insulating pad 250. The insulating pad 250 is provided with four holes each of which corresponds with the bottom ends of one of the resistors 222, 224, 226 and 228, so that the resistors 222, 224, 226 and 228 can make electrical contact with the connectors 230, 232 as described above.

A removable heat exchanger assembly 252 is provided centrally in the storage block 216 for purposes of removal of thermal energy from the thermal storage block 216, when it is required to do so. The removable assembly 252 comprises two graphite block segments 254, 256 which together define a cavity 258 between them for accommodating a tubular heat exchanger (not shown) of which the tubes are in intimate contact with the internal surfaces of the cavity 258 during operation.

The heat exchangers are fabricated from high nickel alloy tubes which can operate at temperatures above 650° C. and up to 900° C.

To assemble the apparatus 210, the thermal insulation 220 is packed into the external steel casing from one of its sides, say the side 212.1, followed by the insertion of the ceramic supports 214.1 through 214.5. Thermal insulation is also provided between adjacent ceramic supports 214.1 through 214.5. This is followed by the introduction of the electrical insulators 218.1 through 218.4, the electrical connectors 230, 232 and the electrical insulation pad 250. Thereafter, the component blocks of the thermal storage block 216 are placed in the casing 212 and the resistors 222, 224, 226 and 228 are prepared by introducing and compacting the granular carbonaceous material in the bores provided in the blocks of graphite material. This is followed by placing the terminals 234, 236, 238 and 240 on the top surfaces of the resistors 222, 224, 226 and 228. The conductors 242, 244, 246 and 248 are connected to the distal ends of the central terminal rods 234.2, 236.2, 238.2, 240.2. The free ends of the conductors 242, 244, 246 and 248 are connected to a supply of electricity. Finally, to provide pressure for holding the constituent parts of the storage block 216 together, the final layers of insulation 220 are inserted into the external steel casing 212 between the storage block 216 and the side 212.2.

In order to avoid oxidation of the graphite storage block 216, an inert gas such as nitrogen, argon or helium, is then introduced into the casing 212, to purge out any air that may be left in it and to prevent ingress of air when the graphite and other carbonaceous material is hot during operation of the apparatus 210.

It has been found that, when good thermal contact is achieved between the storage blocks 254, 256 and the tubular heat exchanger 260, an overall heat transfer coefficient of greater than 1,000 $W/m^{2\circ} K$ is achievable. This compares very favourably with an overall heat transfer coefficient of about 60 $W/m^{2\circ} K$ which is achievable in a conventional fired steam boiler wherein heat is transferred to the water or steam inside the boiler or steam tubes by means of convection heat transfer from the hot flue gases resulting from the combustion of a fuel. The overall heat transfer coefficient in such boilers is limited by a gas film that forms around the boiler tubes, on their hot gas (combustion products) side, and which inhibits the transfer of heat energy into the tube.

Because of its much higher heat transfer coefficient, the heat exchanger 260 forming part of the apparatus 210 can be much smaller than what is required in a conventional boiler or super heaters.

The removable assembly 252 offers the advantage that, when care is taken to ensure that dimensional tolerances are small, intimate contact can be achieved between the block segments 254, 256 and the tubes of the tubular heat exchanger, on the one hand, and between the block segments 254, 256 and the block 216, on the other, thus promoting heat transfer. The removability of the removable heat exchanger assembly 252 facilitates the inspection and maintenance of heat exchanger 260.

Although in FIG. 2 only one removable heat exchanger assembly 252 is shown, several such removable heat exchanger assemblies may be provided, at various positions distributed throughout the storage block 216, so as to facilitate the recovery of heat energy from the storage block 216 when it is required to do so. Similarly, although only four resistors 222, 224, 226 and 228 are shown, any number of resistors may be provided so as to facilitate the input into the storage block 216 of heat energy that is required to be stored therein. The number and distribution of resistors and heat exchangers will depend on the application and the physical properties, such as conductivity and heat capacity, of the graphite material to be used in a specific application. These can be determined by a person skilled in the art, by reasonable experimentation and trial. In use, electrical energy is converted to heat energy by the resistors 222, 224, 226 and 228, and stored in the apparatus 210 in the form of heat energy. This is done by conducting the electricity through the conductors 242 and 246 to the terminals 234 and 238, which in turn conduct the electricity to the resistors 222 and 226. Because the lower ends of the resistors 222, 224 and 238, 240 are respectively interconnected by means of the electrical conductors 230, 232, an electric current entering the resistor 222 through the conductor 242, is conducted via the electrical connector 230 to the resistor 224 and out of the apparatus 210 via the terminal 236 and the conductor 244. Similarly, an electric current entering the apparatus 210 through the conductor 246 is conducted via the terminal 238 to the resistor 226, and from there via the electrical connector 232 to the resistor 228 and out of the apparatus via the terminal 240 and the conductor 248. Where dc current is used, the direction of flow of the current could be the opposite of what has been described above. Where ac current is used, the direction of flow of the current will alternate.

By virtue of the resistance of the resistors 232, 224, 226 and 228, heat is generated when a current flows through the resistor. This heat is dissipated throughout the graphite block 216, where it is stored until required.

When it is required to withdraw heat energy from the apparatus 210, a fluid such as water is circulated through the heat exchanger 260. This causes heat to be transferred to the water passed through the heat exchanger 260 for as long as the temperature of the graphite block 216 is higher than that of the water passing through the heat exchanger 260. The water may be evaporated to form steam, which is preferably heated further so as to form superheated steam, which may be used to drive a turbine or an engine to generate electric power.

Figure 3A:
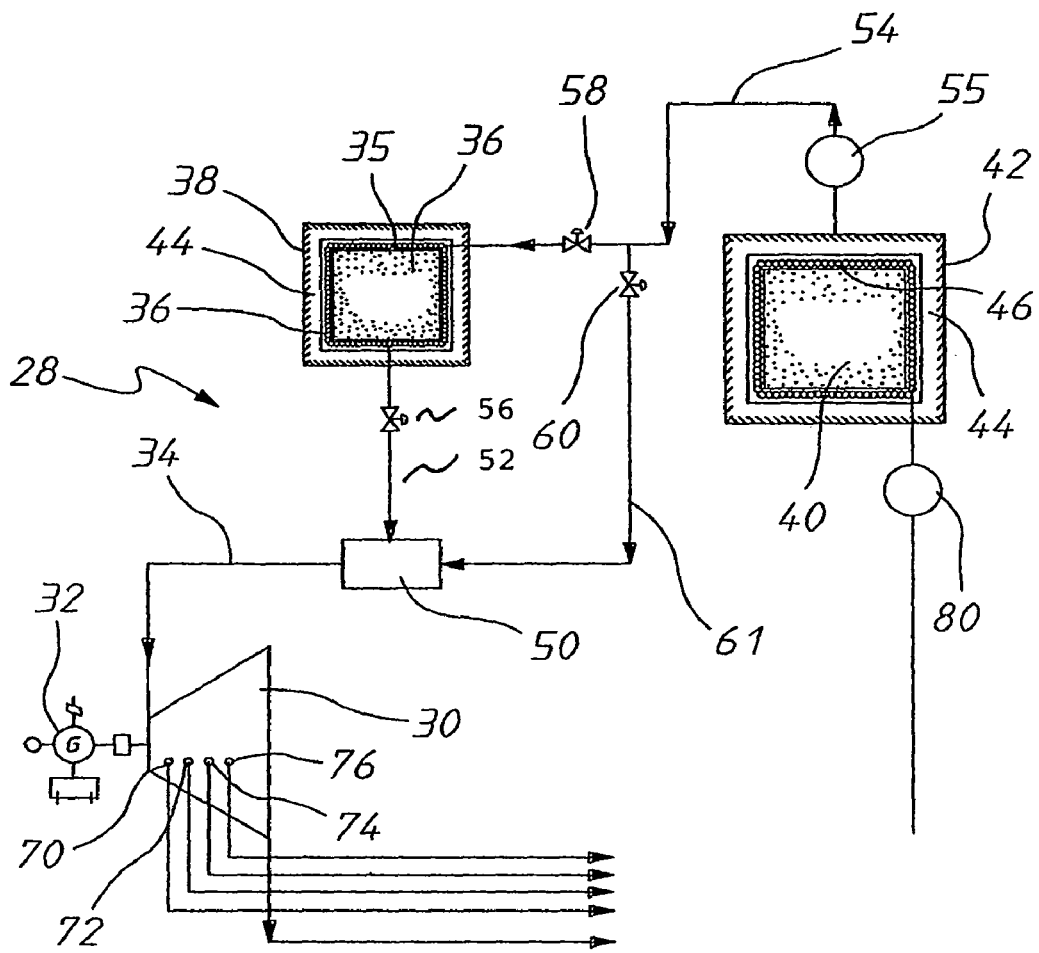
FIG. 3(a) is a schematic flow diagram showing one embodiment of an electric power generation plant incorporating an apparatus in accordance with the invention.

Referring to FIG. 3(a), a power generation plant 28 comprises a steam turbine 30 driving a generator 32 capable of generating electric power. By means of a line 34, superheated steam is fed into the steam turbine 30. The superheated steam is generated in a bank of superheater tubes 35 arranged side by side on the surfaces of a cube-shaped graphite block 36 forming part of an apparatus in accordance with one embodiment of the invention, in which heat obtained from resistance heating using electricity drawn from the mains electricity supply network during off-peak hours, is stored. Although the mains electricity supply has been mentioned in this embodiment of the invention, it is to be understood that the source of the electricity may vary as described above, and may include electricity recovered from renewable energy sources such as wind, hydro and wave energy, of which the availability during some periods exceed the demand therefor, and of which the demand during other periods exceed the availability thereof.

The graphite block 36 is located inside a steel casing 38. A further graphite block 40 is provided for producing saturated steam in a similar fashion to the manner in which steam is superheated by the block 36. The graphite block 40 is located inside a steel casing 42. Insulation 44 is provided between the casing 42 and the block 40 and between the casing 38 and the block 36. Boiler tubes 46 are arranged side by side along the surfaces of the block 40.

Figure 3B:
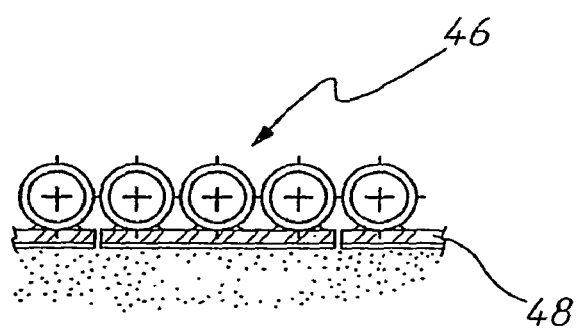
FIG. 3(b) shows a typical layout for boiler and superheater tubes forming part of the apparatus of FIG. 3(a)

FIG. 3(b) shows how the boiler tubes 46 of FIG. 3(a) are arranged side by side and welded longitudinally to the outer surface of a transfer plate 48 made of a suitable alloy. The inner surface of the transfer plate 48 is plasma coated with a suitable material in order to prevent migration of carbon into the alloy, where lower grade alloys are used. Carburisation has the effect of reducing the mechanical properties of the alloy.

In order to control the temperature, pressure and degree of superheat of the steam fed to the turbine 30, a steam mixing/regulating unit 50 is provided, so that superheated steam discharged from the casing 38 through a line 52 may be mixed, if necessary, with saturated steam discharged from the casing 42 through a saturated steam line 54. Control valves 56, 58 and 60 are provided in the lines as shown, in order to control the operating conditions of the steam supplied to the turbine 30.

Exhaust steam may be extracted from the steam turbine 30 at any one or more extraction points 70, 72, 74, 76, and is used to preheat feedwater before being condensed to form condensate which is recirculated for reuse. The condensate is returned to a boiler feed water tank 80. In operation, the electric power generation plant 28 is operated such that, during off-peak periods of electricity consumption, electric power is converted into heat by means of resistors {not shown in FIG. 3(a)} embedded in the graphite blocks 36, 40. During peak periods, the heat stored in the block 40 is utilised to evaporate water in the boiler tubes 46 arranged on the outside surfaces of the block 40, whereafter saturated steam is formed, which is separated from the water in a steam drum 55. The saturated steam is fed by means of the line 54, through the control valve 58, into the superheater tubes 35 arranged on the outside surfaces of the graphite block 36. After superheating, the steam is discharged through the control valve 56 provided in the superheated steam line 52. As described above, the superheated steam passes through the steam mixing and regulating unit 50 before being fed into the steam turbine 30 by means of the superheated steam line 34. In order to control the degree of superheat of the superheated steam, the superheated steam produced in the superheater tubes 35 may be superheated more than required and the degree of superheat of the steam fed to the turbine 30 is then regulated in the steam mixing and regulating unit 50, by admitting saturated steam from the steam drum 55 into the steam mixing and regulating unit 50, by operating the control valve 60, causing saturated steam to flow to the unit 50 via the line 61.

Figure 4:
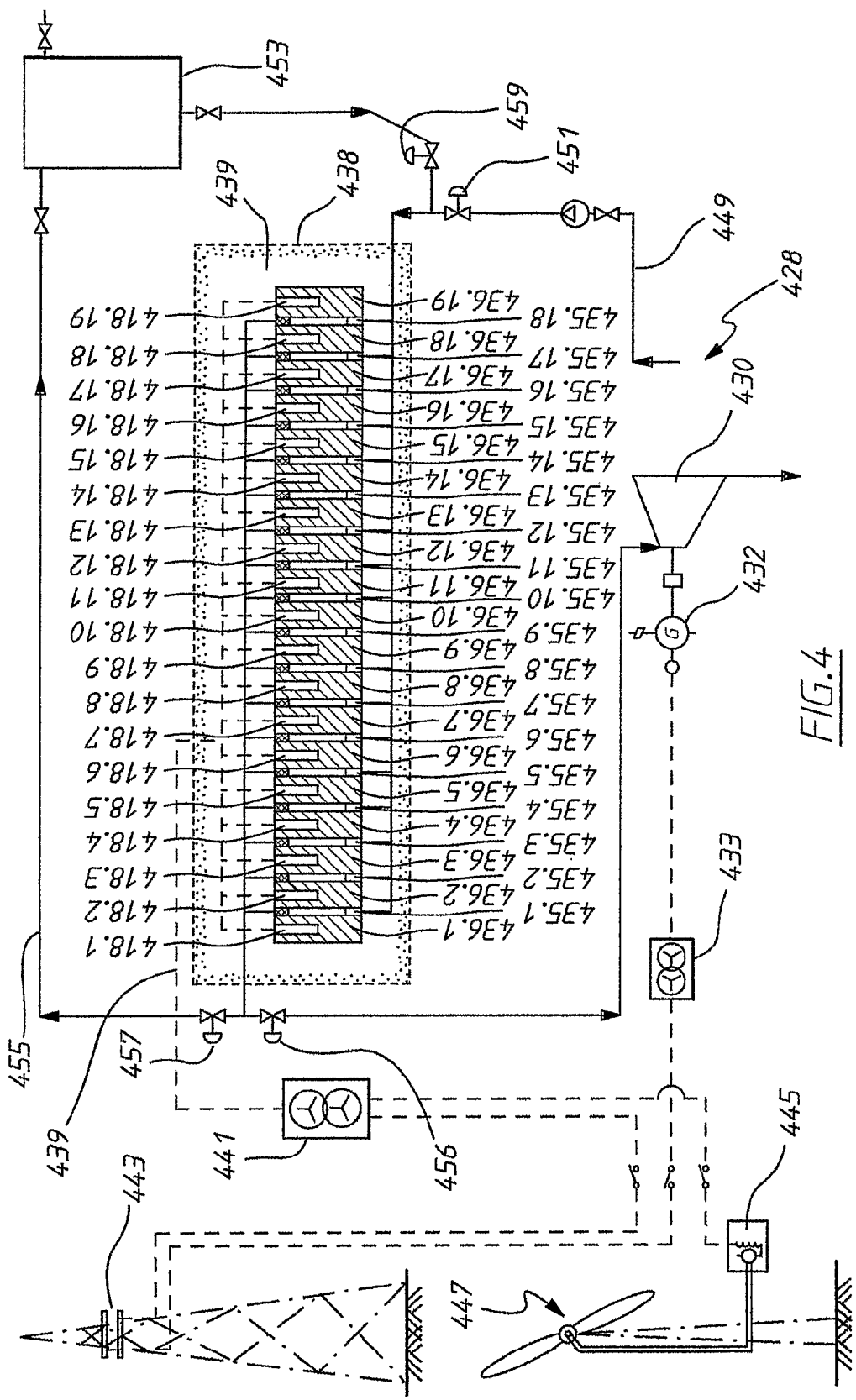
FIG. 4 is a schematic flow diagram showing a heat storage and electric power generation plant incorporating another embodiment of an apparatus in accordance with the invention.

FIG. 4 shows one embodiment of a heat storage and power generation plant 428. The plant 428 comprises a steam turbine 430 driving a generator 432. By means of a line 434, superheated steam is fed to the steam turbine 430. The superheated steam is generated in 18 banks of metal tubes 435.1, 435.2, 435.3, 435.4, 435.5, 435.6, 435.7, 435.8, 435.9, 435.10, 435.11, 435.12, 435.13, 435.14, 435.15, 435.16, 435.17, 435.18 located inside an array of high purity graphite blocks 436.1, 436.2, 436.3, 436.4, 436.5, 436.6, 436.7, 436.8, 436.9, 436.10, 436.11, 436.12, 436.13, 436.14, 436.15, 436.16, 436.17, 436.18, 436.19, with each of the banks of metal tubes 435.1, 435.2, 435.3, 435.4, 435.5, 435.6, 435.7, 435.8, 435.9, 435.10, 435.11, 435.12, 435.13, 435.14, 435.15, 435.16, 435.17, 435.18 respectively being sandwiched between two adjacent graphite blocks.

The graphite blocks 436.1, 436.2, 436.3, 436.4, 436.5, 436.6, 436.7, 436.8, 436.9, 436.10, 436.11, 436.12, 436.13, 436.14, 436.15, 436.16, 436.17, 436.18, 436.19 are located inside and enclosed by a steel casing 438.

An insulation system 439, which conveniently comprises an inert gas to prevent oxidation of the graphite blocks, is provided between the mild steel casing 438 and the graphite blocks 436.1, 436.2, 436.3, 436.4, 436.5, 436.6, 436.7, 436.8, 436.9, 436.10, 436.11, 436.12, 436.13, 436.14, 436.15, 436.16, 436.17, 436.18, 436.19.

Electric energy is converted into heat energy by means of resistance heating of a series of 19 resistors 418.1, 418.2, 418.3, 418.4, 418.5, 418.6, 418.7, 418.8, 418.9, 418.10, 418.11, 418.12, 418.13, 418.14, 418.15, 418.16, 418.17, 418.18, 418.19, each of which is embedded in a corresponding graphite block 436.1, 436.2, 436.3, 436.4, 436.5, 436.6, 436.7, 436.8, 436.9, 436.10, 436.11, 436.12, 436.13, 436.14, 436.15, 436.16, 436.17, 436.18, 436.19 as described in relation to FIGS. 1 and 2.

Electric energy is conducted to the resistors 418.1, 418.2, 418.3, 418.4, 418.5, 418.6, 418.7, 418.8, 418.9, 418.10, 418.11, 418.12, 418.13, 418.14, 418.15, 418.16, 418.17, 418.18, 418.19 via a low tension electrical feed line 439, operatively connected to a transformer 441 which is fed from a supply grid 443. The transformer 441 may also be fed from a generator 445 driven by a windmill 447.

Electric power generated by the generator 432 is fed into the grid 443 via a transformer 433. Boiler feed water or condensate is supplied to the metal tubes 435.1, 435.2, 435.3, 435.4, 435.5, 435.6, 435.7, 435.8, 435.9, 435.10, 435.11, 435.12, 435.13, 435.14, 435.15, 435.16, 435.17, 435.18 via a boiler feed water line 449. The rate of supply is controlled by a control valve 451. A steam accumulator 453 may provide steam for start-ups. The steam accumulator 453 is operatively connected via line 455 and control valve 457 to the steam discharge end of the steel tube 435.1 as well as to an independent steam supply such as a conventional boiler or another apparatus 428, so that steam can be supplied from the steam accumulator 453 via a control valve 459 to the bank of metal tubes 435.1, 435.2, 435.3, 435.4, 435.5, 435.6, 435.7, 435.8, 435.9, 435.10, 435.11, 435.12, 435.13, 435.14, 435.15, 435.16, 435.17, 435.18 when the apparatus 428 is to be started up.

In order to control the amount of steam fed to the turbine 430, a control valve 456 is provided.

In operation, the electric power generation and heat storage plant 428 is operated such that, during off-peak periods of electricity consumption, electric power is converted into heat by means of the resistors 418.1, 418.2, 418.3, 418.4, 418.5, 418.6, 418.7, 418.8, 418.9, 418.10, 418.11, 418.12, 418.13, 418.14, 418.15, 418.16, 418.17, 418.18, 418.19.

During peak periods, the heat stored in the graphite blocks 436.1, 436.2, 436.3, 436.4, 436.5, 436.6, 436.7, 436.8, 436.9, 436.10, 436.11, 436.12, 436.13, 436.14, 436.15, 436.16, 436.17, 436.18, 436.19 is utilised to evaporate boiler feed water and/or condensate in the metal tubes 435.1, 435.2, 435.3, 435.4, 435.5, 435.6, 435.7, 435.8, 435.9, 435.10, 435.11, 435.12, 435.13, 435.14, 435.15, 435.16, 435.17, 435.18 generating superheated steam which is fed by means of the line 434, through the control valve 456.

The embodiment of the heat storage and electric power generation plant shown in FIG. 4 is based on a once through steam generator (OTSG) design. It is also envisaged by the inventors that the principles of the invention can be applied to a steam drum type design as is shown in FIG. 5.

Figure 5:
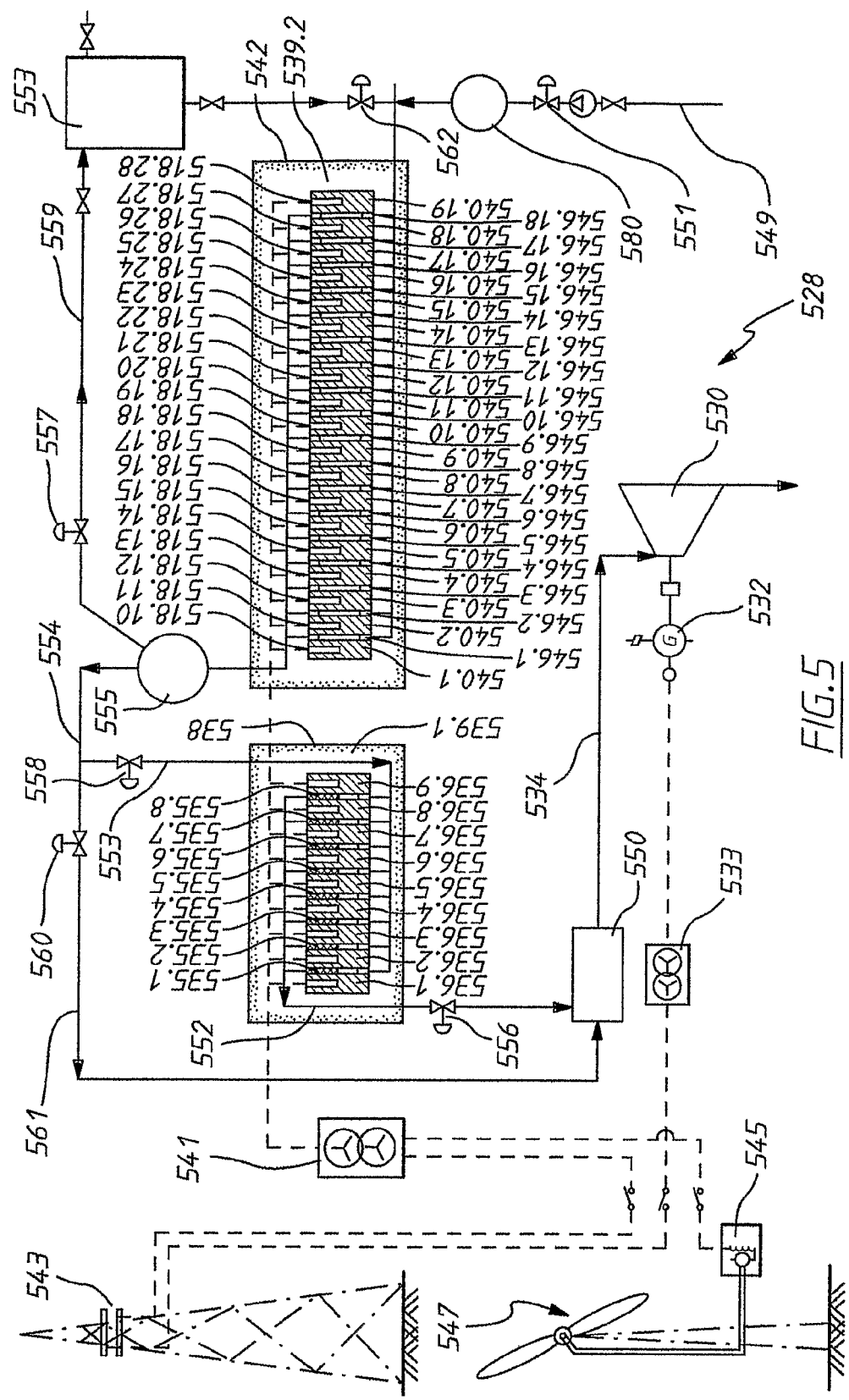
FIG. 5 is a schematic flow diagram showing a heat storage and electric power generation plant incorporating a further embodiment of an apparatus in accordance with the invention.

FIG. 5 thus shows another embodiment of the invention, in the form of a heat storage and electric power generation plant 528. The plant 528 comprises a steam turbine 530 driving a generator 532. By means of a line 534, superheated steam is fed to the steam turbine 530.

The superheated steam is generated in 8 banks of superheater tubes 535.1, 535.2, 535.3, 535.4, 535.5, 535.6, 535.7, 535.8, located inside a first array of 9 high purity graphite blocks 536.1, 536.2, 536.3, 536.4, 536.5, 536.6, 536.7, 536.8, 536.9 with each of the banks of superheater tubes 535.1, 535.2, 535.3, 535.4, 535.5, 535.6, 535.7, 535.8 respectively being sandwiched between two adjacent graphite blocks.

The graphite blocks 536.1, 536.2, 536.3, 536.4, 536.5, 536.6, 536.7, 536.8, 536.9 are located inside and enclosed by a mild steel casing 538.

An insulation system 539.1, which comprises a vacuum or an inert gas to prevent oxidation of the graphite blocks, is provided between the mild steel casing 538 and the graphite blocks 536.1, 536.2, 536.3, 536.4, 536.5, 536.6, 536.7, 536.8, 536.9.

The superheater tubes 535.1, 535.2, 535.3, 535.4, 535.5, 535.6, 535.7, 535.8 are supplied with saturated steam, via a control valve 558 and steam lines 553 and 554, from a steam drum 555. The steam drum 555 is supplied with saturated steam from 18 banks of boiler tubes 546.1, 546.2, 546.3, 546.4, 546.5, 546.6, 546.7, 546.8, 546.9, 546.10, 546.11, 546.12, 546.13, 546.14, 546.15, 546.16, 546.17, 546.18, located inside a second array of 19 high purity graphite blocks 540.1, 540.2, 540.3, 540.4, 540.5, 540.6, 540.7, 540.8, 540.9 540.10, 540.11, 540.12, 540.13, 540.14, 540.15, 540.16, 540.17, 540.18, 540.19 with each of the banks of boiler tubes 546.1, 546.2, 546.3, 546.4, 546.5, 546.6, 5467, 546.8, 546.9, 546.10, 546.11, 546.12, 546.13, 546.14, 546.15, 546.16, 546.17, 546.18 respectively being sandwiched between two adjacent graphite blocks.

The graphite blocks 540.1, 540.2, 540.3, 540.4, 540.5, 540.6, 540.7, 540.8, 540.9 540.10, 540.11, 540.12, 540.13, 540.14, 540.15, 540.16, 540.17, 540.18, 540.19 are located inside and enclosed by a mild steel casing 542.

An insulation system 539.2, which also comprises a vacuum or an inert gas to prevent oxidation of the graphite blocks, is provided between the mild steel casing 542 and the graphite blocks 540.1, 540.2, 540.3, 540.4, 540.5, 540.6, 540.7, 540.8, 540.9 540.10, 540.11, 540.12, 540.13, 540.14, 540.15, 540.16, 540.17, 540.18, 540.19.

In the first array of 9 high purity graphite blocks 536.1, 536.2, 536.3, 536.4, 536.5, 536.6, 536.7, 536.8, 536.9, electric energy is converted into heat energy by means of resistance heating of a series of 9 resistors 518.1, 518.2, 518.3, 518.4, 518.5, 518.6, 518.7, 518.8, 518.9, each of which is embedded in a corresponding graphite block 536.1, 536.2, 536.3, 536.4, 536.5, 536.6, 536.7, 536.8, 536.9, as described in relation to FIGS. 1 and 2.

Similarly, in the second array of 19 high purity graphite blocks 540.1, 540.2, 540.3, 540.4, 540.5, 540.6, 540.7, 540.8, 540.9, 540.10, 540.11, 540.12, 540.13, 540.14, 540.15, 540.16 540.17, 540.18; 540.19, electric energy is converted into heat energy by means of resistance heating of a series of 19 resistors 518.10, 518.11, 518.12, 518.13, 518.14, 518.15, 518.16, 518.17, 518.18, 518.19, 518.20, 518.21, 518.22, 518.23, 518.24, 518.25, 518.26, 518.27, 518.28, each of which is embedded in a corresponding graphite block 540.1, 540.2, 540.3, 540.4, 540.5, 540.6, 540.7, 540.8, 540.9 540.10, 540.11, 540.12, 540.13, 540.14, 540.15, 540.16, 540.17, 540.18, 540.19, as described in relation to FIGS. 1 and 2.

Electric energy is conducted to the resistors 518.1 through 518.28 via a low tension electrical feed line 539, can operatively be connected to a transformer 541 which can be fed from a supply grid 543. The transformer 541 may also be fed from a generator 545 driven by a windmill 547. Electric power generated by the generator 532 is fed into the grid 543 via a transformer 533. Boiler feed water or condensate is supplied to the boiler tubes 546.1, 546.2, 546.3, 546.4, 546.5, 546.6, 546.7, 546.8, 546.9, 546.10, 546.11, 546.12, 546.13, 546.14, 546.15, 546.16, 546.17, 546.18 via a boiler feed water line 549 and a water drum 580. The rate of supply is controlled by a control valve 551.

A steam accumulator 553 may provide steam for start-ups. The steam accumulator 553 is operatively connected via a line 559 and a control valve 557 to the steam drum 555 as well as to an independent steam supply such as a conventional boiler or another apparatus 528, so that steam can be supplied from the steam accumulator 553 via a control valve 562 to the bank of boiler tubes 546.1, 546.2, 546.3, 546.4, 546.5, 546.6, 546.7, 546.8, 546.9, 546.10, 546.11, 546.12, 546.13, 546.14, 546.15, 546.16, 546.17, 546.18 when the apparatus 528 is to be started up.

In order to control the temperature, pressure and degree of superheat of the steam fed to the turbine 530, a steam mixing/regulating unit 550 is provided, so that superheated steam discharged from the superheater tubes 535.1 through 535.8 through a line 552 may be mixed, if necessary, with saturated steam fed from the steam drum 555 through the saturated steam line 554 and a further line 561.

Control valves 556 and 560 are provided in the superheated and saturated steam lines respectively, in order to control the operating conditions of the steam supplied to the turbine 30. In operation, the electric power generation and heat storage plant 528 is operated such that, during off-peak periods of electricity consumption, electric power is converted into heat by means of the resistors 518.1 through 518.28 when electricity from the grid 543 is fed to them. The heat is stored in the graphite blocks 536.1 through 536.9 and 540.1 through 540.19.

During peak periods, the heat stored in the graphite blocks 540.1 through 540.19 is utilised to evaporate boiler feed water and/or condensate in the boiler tubes 546.1 through 546.19 to produce saturated steam which is discharged into the steam boiler 555. At the same time, the heat stored in the graphite blocks 536.1 through 536.9 is utilised to superheat saturated steam in the superheater tubes 535.1 through 535.8 to produce superheated steam which is fed via the line 552, the steam mixing and regulating unit 550 and the line 534, to the turbine 530. The turbine 530 drives the generator 532 which in turn generates electricity which is fed into the grid 543.

Figure 6:
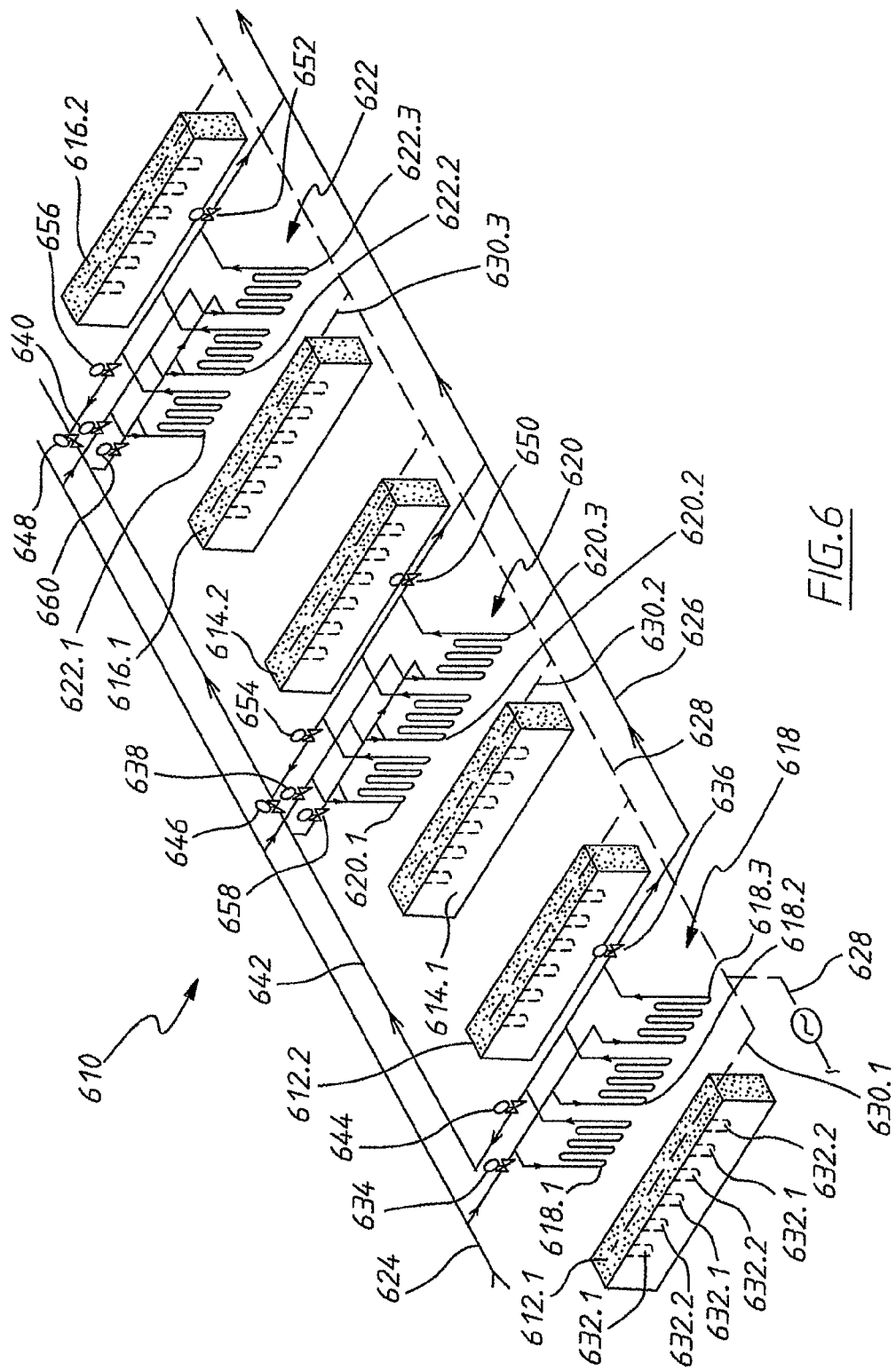
FIG. 6 is a schematic flow diagram showing an exploded view of a temperature compensated heat storage and recovery system in accordance with another aspect of the invention.

Referring to FIG. 6, there is shown a schematic flow diagram of a temperature compensated heat storage and recovery system 610 in accordance with the invention. The system 610 comprises three pairs of heat block segments 612.1, 612.2, 614.1; 614.2 and 616.1, 616.2. Between each pair of heat block segments 612.1, 612.2; 614.1, 614.2 and 616.1, 616.2, a bank of heat exchanger tubes 618, 620, 622 may be clamped so as to provide intimate contact between adjacent surfaces of the pairs of blocks 612.1, 612.2; 614.1, 614.2; 616.1, 616.2. Each of the banks of heat exchanger tubes 618, 620, 622 consists of three tubes 618.1, 618.2, 618.3; 620.1, 620.2, 620.3; and 622.1, 622.2, 622.3 which are connected in parallel. A feedwater supply line 624 conducts boiler feedwater to the banks of heat exchanger tubes 618, 620, 622, whilst a superheated steam outlet line or manifold 626 conveys superheated steam from the banks of heat exchangers 618, 620, 622 to where it may be utilised to drive a turbine, engine, or the like (not shown). An electrical power input feed cable 628 conducts electric power to reticulation cables 630.1, 630.2, 630.3 which in turn conduct electric power to three pairs of resistors 632, 632.2, etc., provided in each of the heat block segments 612.1, 612.2, 614.1, 614.2, 616.1, 616.2 (for the sake of clarity, only the resistors in the heat block segments 612.1, 612.2 have been numbered in the drawing).

In operation, electric power obtained from the grid during off-peak times, or recovered from a renewable energy source such as a solar, wind, wave or tidal energy source, is used to heat the heat block segments 612.1, 612.2' 614.1, 614.2; 616.1, 616.2, by resistance heating of the resistors 632.1, 632.2, etc., of each of the heat block segments 612.1, 612.2; 614.1, 614.2 and 616.1, 616.2. When it is desired to recover heat energy from the heat block segments 612.1, 612.2, 614.1, 614.2, 616.1 and 616.2, boiler feed water is introduced into the heat exchanger 618 by opening a control valve 634, causing boiler feed water to flow through the heat exchangers 618.1, 618.2, 618.3 and to extract heat from the storage block segments 612.1, 612.2. The water is evaporated and the steam that forms is superheated to the required temperature and pressure before it is discharged through the control valve 636 into the superheated steam line or manifold 626.

The heat exchanger banks 620 and 622 of the heat block segments 614.1, 614.2 and 616.1, 616.2 can be supplied with feedwater from the feedwater line 624 by operating control valves 638, 640 respectively. Alternatively, they may be supplied by heated boiler feed water or saturated steam through the line 642, by opening a control valve 644 therein, permitting the heated boiler feed water or saturated steam to be passed from the heat exchanger 618 to either one or both of the heat exchangers 620, 622, provided that further control valves 646 and 648 are open.

The further control valves 646 and. 648 may alternatively (and preferably) be operated such as to ensure that a flow of saturated steam or heated boiler feed water is directed from the heat exchanger 618 when its temperature is too low for the production of superheated steam of the desired temperature and pressure, through the heat exchanger 620 to the heat exchanger 622 so as to be evaporated and superheated before being discharged into the superheated steam line 626, through the control valves 650, 652. Control valves 654, 656 are provided to respectively direct saturated steam and/or heated boiler feed water from the heat exchanger 620 to the heat exchanger 622, or from the heat exchanger 622 to subsequent heat exchangers in the train of heat exchangers (the balance of the train not being shown) before superheated steam generated in the respective heat exchanger is discharged into the superheated steam manifold 626.

It is also possible to isolate any one or more of the heat exchangers 618, 620, 622 from both the feed water line 624 water and the superheated steam line or manifold 626 for instance, during times when heat is to be stored in the respective storage block segments 612.1, 612.2; 614.1, 614.2; 616.1, 616.2.

Each of the sets of storage block segments 612.1, 612.2; 614.1, 614.2; 616.1, 616.2 can be fed separately from the boiler feed water line 624 by opening one of the control valves 658, 660 respectively feeding the heat exchangers 620 and 622.

To be able to operate efficiently, turbines or engines driven by steam normally require the steam to be delivered over a very limited range of temperatures and pressures. Steam produced in a conventional boiler and super heater can be controlled with relative ease, because of the relatively constant temperatures and heat fluxes in such boilers and hence the energy transfer rate and the resulting temperature and pressure of the steam are usually fairly constant.

In the thermal storage blocks 612.1, 612.2; 614.1, 614.2; and 616.1, 616.2 the extraction of heat results in a progressive reduction in their temperature. The rate of energy transfer is a function of the temperature difference ($\Delta T$) between the relevant block 612.1, 612.2; 614.1, 614.2; 616.1, 616.2 and the receiving fluid, and the area through which the energy transfer occurs. This relationship can be expressed by the equation:

$$q=f(A, \Delta T)$$

wherein
 'q'=energy transfer rate and
 'A'=heat exchanger area.

To maintain an even rate of energy transfer, and hence a consistent condition of the steam produced, and because of the variation of $\Delta T$, it is necessary to be able to vary the area of transfer (heat exchanger surface).

In operation, the system 610 is controlled, by the operation of the control valves 634, 636, 638, 640, 644, 646, 648, 650, 652, 654, 656, 658, 660, so as to sequentially withdraw heat from the heat block segments 612.1, 612.2; 614.1, 614.2 and 616.1, 616.2. When the temperature of the heat block segments 612.1, 612.2 has dropped to a point where the temperature difference ($\Delta T$) between the heat block segments 612.1, 612.2 and the steam or water in the heat exchanger 618 has dropped to a point where superheated steam of the desired temperature and pressure can no longer be produced in the heat exchanger 618, the control valve 636 is closed whilst the control valve 644 is opened, allowing steam and/or heated boiler feed water to flow through the line 642 to the heat exchanger 620 where it is evaporated or further evaporated and superheated before being discharged, through the control valve 650, into the superheated steam manifold 626.

Initially, no boiler feed water is admitted into the heat exchanger 620 from the boiler feed water line 624 through the control valve 638. The control valve 638 is preferably only opened once the amount of heat that can be still extracted from the heat block segments 612.1, 612.2 has diminished to a level where it is no longer economical to circulate boiler feed water through the heat exchanger 618. At that point, the control valve 634 is closed whilst the control valve 638 is opened. The control valve 640 is then still closed, but it may be opened, in a similar way as the control valve 638, when, after some time, it is no longer economically or technically feasible to extract heat from the storage block segments 614.1, 614.2.

The same process as described above for the heat block pairs 612.1, 612.2 is repeated for the heat block pairs 614.1, 614.2 and 616.1, 616.2.

The operation of the control valves may be automated and may be controlled by a programmable device (not shown) to ensure that the opening and closing of the control valves responds to pre-set temperature and pressure conditions, as may be required in the manifold 626, for the steam feed to the turbine or engine.

The heat exchanger tubing utilised is preferably selected such as to withstand the stresses generated by the temperatures and pressures of the system to comply with the appropriate design code standards. Those alloys meeting the requirements up to 850° C. include Alloy 600, Alloy 800H and 556 Alloy.

Startup may be achieved by using saturated water (water just below the temperature at which it becomes steam at a given pressure), preferably at around 300° C. and under pressure, to control thermal shock. The rate of saturated water flow is gradually increased until the required flow rate is reached, thus controlling the rate of temperature decrease in the tubing and consequent thermal stresses.

The thermal energy storage system of the invention may be designed for use over a large range of output capacities (from generators as small as 5 kW output, to hundreds of MW output) and to be constructed in size modules that will store power for several weeks and even longer if necessary.

The system may be designed to cover the gap between the intermittent availability of renewable energies (such as wind, solar, hydro power, tidal and wave energy) by recovering and storing the energy when it is available and by releasing it from storage during periods of non availability or decreased availability.

Removable inserts as described in relation to FIG. 2 may optionally be provided between the graphite blocks of FIGS. 4, 5 and 6.

A range of uses for the apparatuses and methods in accordance with the present invention includes, but is not limited to:

Storing surplus energy available off peak for release in peak periods, thus better utilising existing generation assets.

Relocating existing generation capacity into load centres for availability at peak periods, thus avoiding the need for expensive network upgrades to transmission and distribution systems.

Providing generation capacity (distributed generation) within distribution systems as a security measure where those distribution systems are subject to outages because of single supply lines.

Integration of renewable energy sources into networks, to overcome the irregularity of sources, such as wind.

Replacing high cost and polluting off-grid or "islanded" grid systems running on fossil fuels with a reliable renewable energy supply of power.

Figure 7:
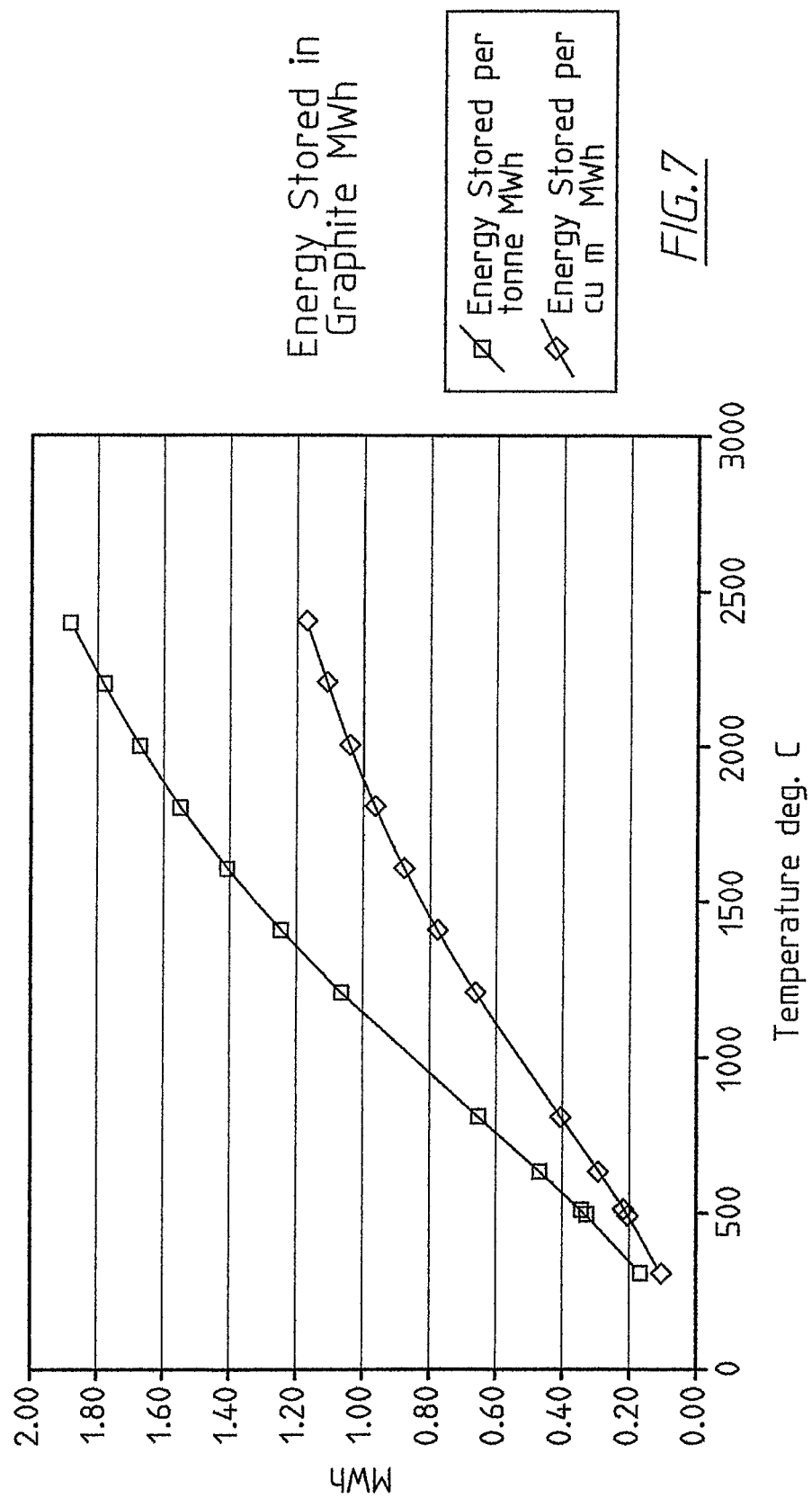
FIG. 7 is a graphical representation of the amount of energy that can be stored in one tonne of graphite at increasing temperature.
Figure 8:
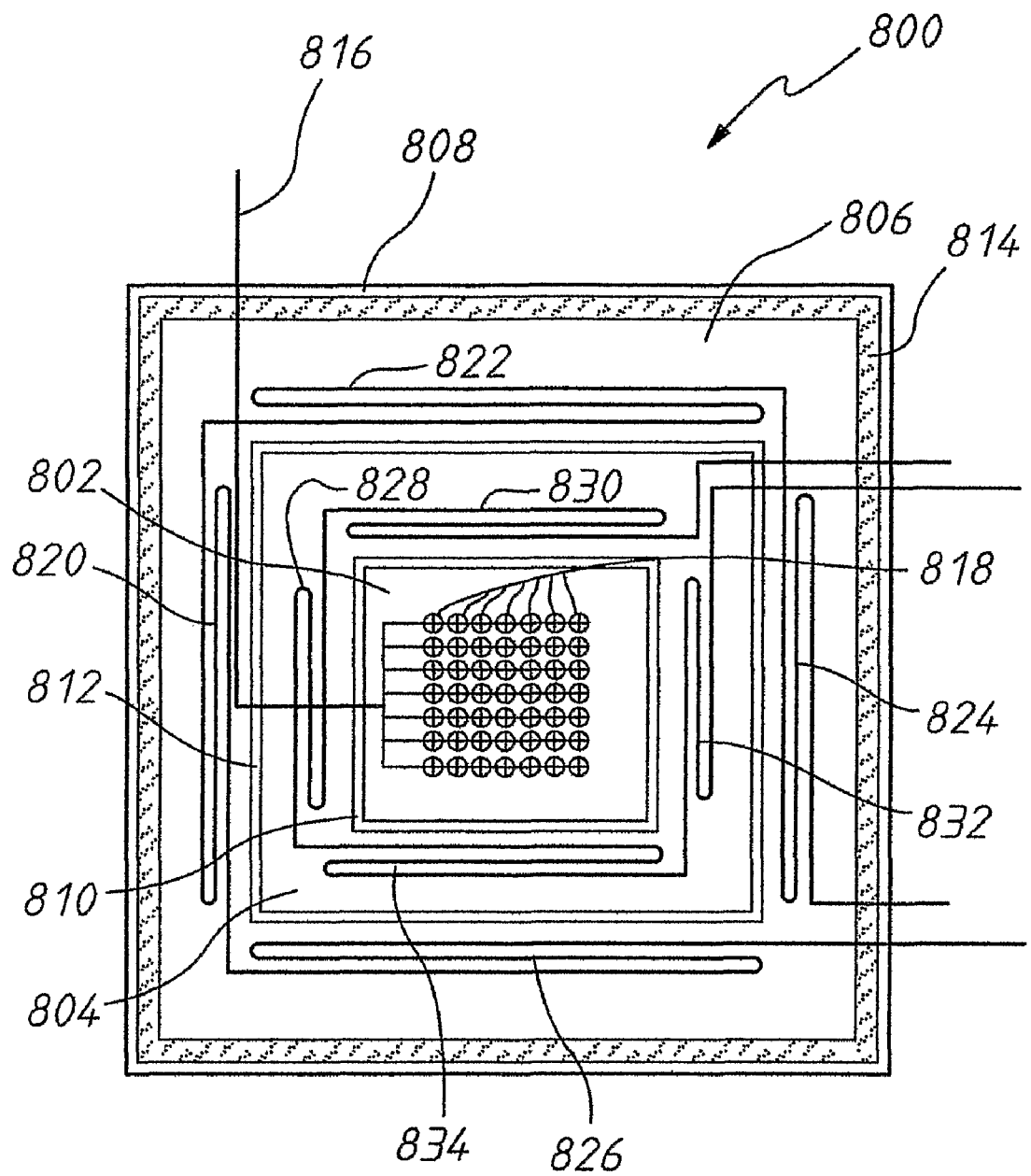
FIG. 8 is a diagrammatic representation of a further embodiment of a heat storage apparatus in accordance with the invention.

Referring to FIG. 7, there is shown the energy (expressed in megawatt hours) that can be stored in graphite at a storage temperature of from 300° C. to 2400° C. The graphs in FIG. 7 are graphic representations of the data contained in Table 1. The bottom graph shows energy stored per tonne of graphite, whilst the upper graph represents energy stored per cubic metre of graphite. Referring to FIG. 8, there is shown a further embodiment of the heat storage apparatus 800 in accordance with the invention. The apparatus 800 comprises a cube-shaped high temperature core 802 surrounded by an intermediate temperature layer 804 which in turn is surrounded by a low temperature layer 806.

The high temperature core 802, the intermediate temperature layer 804 and the low temperature layer 806 are all made of high purity graphite and are completely enclosed within an enclosure 808.

High temperature thermal insulation material 810 separates the high temperature core 802 from the intermediate temperature layer 804, whilst intermediate temperature thermal insulation material 812 separates the intermediate temperature layer 804 from the low temperature layer 806. A further thermal insulation layer 814 is provided between the low temperature layer 806 and the enclosure 808.

An electrical conductor 816 conducts electricity to an array of 49 resistors 818 that are embedded in the high temperature core 802. The resistors 818 are arranged in seven rows of seven resistors each, as is shown in FIG. 8.

Four banks of heat exchanger tubes 820, 822, 824 and 826 are provided in the low temperature layer 806, one on each of four sides of the intermediate temperature layer 804. Four further banks of heat exchanger tubes 828, 830, 832 and 834 are provided in the intermediate temperature layer, one on each of the sides of the high temperature core 802.

As is shown in FIG. 8, the heat exchanger tubes 820, 822, 824 and 826 and 828, 830 832 and 834 are respectively interconnected in a serial fashion. However, in alternative embodiments of the invention, they may be connected to separate steam or hot water circuits or in still further alternative embodiments, two or more of them may be connected to the same steam or hot water circuit in parallel fashion or may be designed and operated such as to convey boiler feed water to the tubes heated by the respective layer of graphite and steam or superheated steam therefrom.

In use, off peak electricity or electricity generated from variable sources such as wind farms, solar collectors, etc, may be conducted to the heat storage apparatus 800 via the electric conductor 816, and converted into heat energy by means of the resistors 818.

When required, heat energy may be extracted from either the intermediate temperature layer 804 or the low temperature layer 806, by passing water or steam through one or more of the banks of heat exchanger tubes.

When heat is extracted from the low temperature layer 806 or the intermediate temperature layer 804, their temperatures decrease in accordance with the graphs shown in FIG. 7. As the temperature of the intermediate temperature layer 804 decreases to below the temperature of the high temperature core 802, the difference in temperature between the intermediate temperature layer 804 and the high temperature core 802 will cause heat to be conducted from the high temperature core 802 through the high temperature thermal insulation material 810 to the intermediate temperature layer 804. Similarly, when the temperature of the low temperature layer 806 falls below the temperature of the intermediate temperature layer 804, heat is conducted through the intermediate temperature thermal insulation material 812 to the low temperature layer 806.

Because of the layered construction of the thermal storage apparatus 800 and because of the thermal insulation material between the high temperature core 802 and the intermediate temperature layer 804 and between the intermediate temperature layer 804 and the low temperature layer 806, it is possible to use materials of construction for the bank of heat exchanger tubes which do not have to be able to withstand the high operating temperatures of the high temperature core 802. In this way, it is possible to use materials of lower cost than would otherwise be the case. However, it becomes important to control the operation of the thermal storage apparatus 800 in such a way that the operating temperature of the heat exchanger tubes does not exceed safe operating limits imposed by manufacturers.

In addition, by arranging the high temperature core 802 to be located centrally, with layers of graphite surrounding it so that the layer with the lowest operating temperature is closest to the outside, energy losses from the apparatus through the further thermal insulation material 814 can be minimised.

The invention claimed is:

1. A method of storing heat energy in a body of graphite at an elevated temperature and recovering the heat energy therefrom, comprising the steps of:
    heating an inner region of the body of graphite when it is required to store the heat energy and
    recovering the stored heat energy, when it is required to be recovered, wherein the heating step comprises passing an electric current through a resistor disposed in a bore or well in the inner region of the body of graphite, so as to cause its temperature to rise, and
    wherein the resistor is electrically isolated from the body of graphite by means of a layer of electrically insulating material provided between a substantial portion of an inner surface of the bore or well and the resistor, so as to ensure that most of the electric current flows through a desired region or area or proportion of the internal surface of the bore or well located in a position within the body of solid graphite material and remote from the surface thereof.

2. A method as claimed in claim 1, comprising the step of thermally insulating the body of graphite from its environment.

3. A method as claimed in claim 1, wherein the body of graphite is subdivided into a plurality of parts or subdivisions.

4. A method of storing heat energy and generating electric power from such stored heat energy, comprising the steps of storing heat energy as claimed in claim 1, and converting said recovered heat energy into electric power.

5. An apparatus for storing heat energy in a body of graphite at an elevated temperature and for recovering the heat energy therefrom, comprising:
    a resistor for heating an inner region of the body of graphite when it is required to store the heat energy; and
    recovering stored heat energy from the body of graphite when it is required to be recovered, wherein the heating steps comprises passing an electric current through a resistor disposed in a bore or well in the inner region of the body of graphite, so as to cause its temperature to rise, and
    wherein the resistor is electrically isolated from the body of graphite by means of a layer of electrically insulating material provided between a substantial portion of an inner surface of the bore or well and the resistor, so as to ensure that most of the electric current flows through a desired region or area or proportion of the internal surface of the bore or well located in a position within the body of solid graphite material and remote from the surface thereof.

6. An apparatus as claimed in claim 5, comprising an electric circuit connected to a source of electricity selected from electric power recovered from a renewable energy source and off-peak electricity.

7. An apparatus as claimed in claim 5, further comprising an enclosure adapted to contain the body of graphite in an atmosphere of a non-oxidising gas or in a vacuum.

8. An apparatus as claimed in claim 5, wherein the resistor is electrically isolated from the body of graphite by means of a ceramic tube containing the resistor.

9. An apparatus as claimed in claim 5, comprising a first body of graphite and at least one additional body of graphite wherein the first body of graphite is thermally insulated from the or each additional body of graphite.

10. An apparatus as claimed in claim 5, wherein the body of graphite is divided into a central high temperature core and at least one layer surrounding the central high temperature core.

11. An apparatus as claimed in claim 10, comprising thermal insulation between the core and the or each layer surrounding the core.

12. An apparatus or system as claimed claim 5, wherein the resistor is connected to a supply of electricity through a pair of electrical contacts and wherein the electrical contacts are made of the same material.

13. An apparatus as claimed in claim 5, wherein the means for recovering stored heat energy from the body of graphite comprises a heat exchanger for evaporating water to generate steam, a turbine driven by the steam, and a power generator driven by the turbine.

14. An apparatus as claimed in claim 13, wherein the heat exchanger comprises a bank of heat exchanger tubes, wherein the body of graphite is divided into a pair of segments and wherein said bank of heat exchanger tubes is clamped between the pair of segments so as to provide intimate contact between adjacent surfaces of the pair of segments.

15. An apparatus as claimed in claim 14, wherein said apparatus further comprises a plurality of bodies of graphite and a plurality of heat exchangers, wherein a said heat exchanger comprises a bank of heat exchanger tubes, wherein each body of graphite is divided into a pair of segments and wherein a said bank of heat exchanger tubes is clamped between a pair of segments so as to provide intimate contact between adjacent surfaces of the pair of segments.

16. A heat storage and electric power generation plant comprising an apparatus for storing heat energy as claimed in claim 5 and means for converting said recovered heat energy into electric power.

17. A temperature compensated heat storage and recovery system, comprising:
a first body of graphite adapted to store heat energy at an elevated temperature;
a first heat exchanger in heat exchange relationship with the first body of graphite for recovering heat energy therefrom;
a first working fluid circuit operatively connected to the first heat exchanger for conducting a working fluid from a source thereof via the first heat exchanger to a device where a portion of the heat energy of the working fluid can be utilized;
a second body of graphite adapted to store heat energy at an elevated temperature;
a second heat exchanger in heat exchange relationship with the second body of graphite, whereby a combined heat exchange area of the first and second heat exchangers may be increased to compensate for a temperature drop in the first and second bodies of graphite;
a second working fluid circuit operatively connected to the second heat exchanger for conducting the working fluid from the source thereof via the second heat exchanger to the device where a portion of the heat energy of the working fluid can be utilized, the second working fluid circuit comprising a control valve adapted to be opened and closed;
a control system adapted to compensate for a reduction in heat recovered from the first body of graphite as a result of a drop in the temperature thereof, by causing working fluid or a larger amount thereof to be admitted to the second heat exchanger via the second working fluid circuit, utilizing the increased combined heat exchange area for transfer of heat; and
a manifold for conducting the heated working fluid from the heat exchanger(s) to the device where a portion of the heat energy of the working fluid can be utilized, wherein the control system comprises a programmable device coupled to the control valve to ensure that the opening and closing of the control valve responds to preset temperature and pressure conditions, as may be required in said manifold, for the feed to the device.

18. A system as claimed in claim 17, comprising a first body of graphite and at least one additional body of graphite wherein the first body of graphite is thermally insulated from the or each additional body of graphite.

19. A system as claimed in claim 17, wherein the first body of graphite is a central high temperature graphite core and wherein the second body of graphite is a layer of graphite surrounding the graphite core.

20. A system as claimed in claim 17, wherein the working fluid is water which is evaporated, in use, to generate steam, and wherein the system further comprises a turbine driven by the steam and a power generator driven by the turbine.

21. A system as claimed in claim 17, wherein at least one of the heat exchanges comprises a bank of heat exchanger tubes, wherein the body of graphite is divided into a pair of segments and wherein said bank of heat exchanger tubes is clamped between the pair of segments so as to provide intimate contact between adjacent surfaces of the pair of segments.

22. A temperature compensated heat storage and recovery system, comprising:
a first body of graphite adapted to store heat energy at an elevated temperature;
a first heat exchanger in heat exchange relationship with the first body of graphite for recovering heat energy therefrom;
a first working fluid circuit operatively connected to the first heat exchanger for conducting a working fluid from a source thereof via the first heat exchanger to a device where a portion of the heat energy of the working fluid can be utilized;
a second body of graphite adapted to store heat energy at an elevated temperature;
a second heat exchanger in heat exchange relationship with the second body of graphite, whereby a combined heat exchange area of the first and second heat exchangers may be increased to compensate for a temperature drop in the first and second bodies of graphite;
a second working fluid circuit operatively connected to the second heat exchanger for conducting the working fluid from the source thereof via the second heat exchanger to the device where a portion of the heat energy of the working fluid can be utilized, the second working fluid circuit comprising a control valve adapted to be opened and closed;
a control system adapted to compensate for a reduction in heat recovered from the first body of graphite as a result of a drop in the temperature thereof, by causing working fluid or a larger amount thereof to be admitted to the second heat exchanger via the second working fluid circuit, utilizing the increased combined heat exchange area for transfer of heat;
wherein the working fluid is water which is evaporated, in use, to generate steam;
a turbine driven by the steam and a power generator driven by the turbine; and
a manifold for conducting the steam from the heat exchanger(s) to the turbine, wherein the control system comprises a programmable device coupled to the control valve to ensure that the opening and closing of the control valve responds to preset temperature and pressure conditions, as may be required in said manifold, for the feed to the turbine.

* * * * *